(12) United States Patent
Holmberg

(10) Patent No.: US 6,539,458 B2
(45) Date of Patent: Mar. 25, 2003

(54) HIERARCHICAL MEMORY FOR EFFICIENT DATA EXCHANGE CONTROL

(75) Inventor: Per Anders Holmberg, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 23 days.

(21) Appl. No.: 09/840,468

(22) Filed: Apr. 24, 2001

(65) Prior Publication Data

US 2002/0138700 A1 Sep. 26, 2002

(30) Foreign Application Priority Data

Apr. 28, 2000 (EP) .......................................... 00109045

(51) Int. Cl.$^7$ ............................................. G06F 12/08
(52) U.S. Cl. .................. 711/137; 711/117; 711/118; 711/119; 711/125; 711/128; 711/133; 711/140
(58) Field of Search .................... 711/117, 118, 711/119, 125, 128, 133, 137, 140

(56) References Cited

U.S. PATENT DOCUMENTS

| | | | | |
|---|---|---|---|---|
| 5,778,435 A | | 7/1998 | Berenbaum et al. | 711/137 |
| 6,237,074 B1 | * | 5/2001 | Phillips et al. | 711/213 |
| 6,292,871 B1 | * | 9/2001 | Fuente | 711/136 |
| 6,308,242 B1 | * | 10/2001 | Kim | 711/135 |
| 6,385,719 B1 | * | 5/2002 | Derrick et al. | 712/235 |
| 6,473,837 B1 | * | 10/2002 | Hughes et al. | 711/146 |

FOREIGN PATENT DOCUMENTS

EP  0 380 854 A  8/1990

OTHER PUBLICATIONS

*IEEE Transactions on Computers*, US, IEEE Inc., New York, vol. 47, No. 5, May 1, 1998, pp. 497–508, XP000754146, ISSN: 0018–9340, Wei–Chung Hsu et al., "A Performance Study of Instruction Cache Prefetching Methods".

*Proceedings of the Annual Symposium on Computer Architecture*, US, New York, ACM, vol. Symp. 22, Jun. 22, 1995, pp. 287–296, XP000687816, ISBN: 0–7803–3000–5, Brad Calder et al., "Next Cache Line and Set Prediction".

*Proceedings of the Annual International Symposium on Computer Architecture*, us, Los Alamitos, IEEE Comp. Soc. Press, vol. Symp 17, May 28, 1990, pp. 364–373, CP000144808, ISBN: 0–8186–2047–1, Norman P. Jouppi, "Improving Direct–Mapped Cache Performance by the Addition of a Small Fully–Associative Cache and Prefetch Buffers".

* cited by examiner

Primary Examiner—T. V. Nguyen
(74) Attorney, Agent, or Firm—Nixon & Vanderhye, PC

(57) ABSTRACT

A data processing system and method involving a data requesting element and a first memory element from which said data requesting element requests data is described. An example of such a system is a processor and a first level cache memory, or two memories arranged in a hierarchy. A second memory element is provided between the first memory element and the requesting element. The second memory element stores data units read out of said first memory element, and performs a prefetch procedure, where said prefetch procedure contains both a sequential sub-procedure and a sub-procedure based on prefetch data identifiers associated with some of the data units.

41 Claims, 12 Drawing Sheets

HIERARCHICAL MEMORY FOR EFFICIENT DATA EXCHANGE CONTROL

FIELD OF THE INVENTION

The present invention relates to a data processing system and method involving a data requesting element and a memory element from which said data requesting element requests data. An example of such a system is a processor and a first level cache memory, or two memories arranged in a hierarchy.

BACKGROUND OF THE INVENTION AND PRIOR ART

The concept of a hierarchical memory structure is known in the art. The term "hierarchical" implies that instead of having a single memory from which data is requested, a hierarchy of levels is used, where data is first requested by e.g. a processor from a first level memory, and if the requested data is present in the first level memory (which is also referred to as a "hit"), it is provided to the processor. If not (which is also referred to as a "miss"), a request is given to a second level memory provided below the first level memory in the hierarchy. If the data is present in the second level memory, then it is provided to the processor from there, and possibly also stored in the first level memory. A third level may be provided below the second level, and further levels below that. An example of such a structure is processor using a memory structure having a first and second level cache, below that a main memory, and below that a disk memory.

The memories are organized in such a way that higher level memories tend to be smaller and faster (in terms of access) than lower level memories. The advantages of such a structure will be explained further on.

In more detail, as shown schematically in FIG. 12, a conventional data processing arrangement with a hierarchical memory typically comprises a processor or CPU (central processing unit) 10 that contains a program counter 11 containing instruction addresses to be performed, said program counter being controlled by a control unit 12. A computational element 13 or ALU (arithmetic logic unit) performs operations on data held in registers 14 under the control of the control unit 12 in accordance with the instructions indicated by the addresses from the program counter. A main memory 30 is provided for storing program data under the corresponding instruction addresses. The main memory 30 is a RAM type memory that will typically be connected to a slow memory with large volume, such as a hard disk drive 40. A cache memory 20 is arranged as an intermediate memory between the main memory 30 and the CPU 10 for storing part of the program data under the corresponding instruction addresses.

The instruction execution performed by the processor is typically pipelined, which means that the multiple steps of successive instructions are performed in overlap. In other words, each instruction is broken down into a predetermined number of basic steps (e.g. fetch, decode, operate and write), and a separate hardware unit is provided for performing each of these steps. Then these steps can be performed in overlap for consecutive instructions during one cycle, e.g. while the write step is being performed for a first instruction, simultaneously the operate step is performed for a second instruction, the decode step is performed for a third instruction and the fetch step is performed for a fourth instruction. This is well known in the art and need not be explained further here.

A memory hierarchy using a cache in addition to the main memory takes advantage of locality and cost/performance of memory technologies. The principle of locality says that most programs do not access all code or data uniformly. This principle, plus the guideline that smaller hardware is faster, leads to the hierarchy based on memories of different speeds and sizes. Since fast memory is expensive, a memory hierarchy is organized into several levels, each smaller, faster, and more expensive per byte than the next level. The goal is to provide a memory system with cost almost a low as the cheapest level of memory and speed almost as fast as the fastest level. The levels of the hierarchy usually subset one another; all data in one level is also found in the level below, and all data in that lower level is found in the one below it, and so on until the bottom of the hierarchy is reached. Normally, each level maps addresses from a larger memory to a smaller but faster memory higher in the hierarchy. Present terminology calls high-level memories cache memories. It is known to provide a plurality of cache levels.

For example, as can be seen in FIG. 12, the cache memory 20 stands higher in the hierarchy than main memory 30, and main memory 30 stands higher in the hierarchy than disk drive 40. When the CPU 10 requests data, it first requests the data from the cache 20. In the event of a miss, the data must be fetched from the main memory 30, and if again a miss occurs, it must be fetched from the disk drive 40. Typically, the CPU will output virtual addresses, i.e. addresses that define a virtual address space, whereas the data will be stored at physical addresses. The actual reading out of data from one of the memories therefore usually requires an address translation from virtual to physical.

Data is read into each of the memories in specific data units. In the case of the main memory 30 such a data unit is called a page, in the case of the cache memory 20 it is called a line or block. Each page or line consists of a number of data words. The CPU 10 can read data out of cache 20 in any desired way, be it in units of lines or in units of words.

Data in a cache memory are organized by directories which are called address tags. Usually, a group of data is associated with one tag. For example, data associated with tag 0123X might have addresses 01230 through 01237. This group of data e.g. forms the above mentioned cache line. Usually, a cache directory behaves associatively, that is, the cache directory retrieves information by key rather than by address. To determine if a candidate address is in the cache, the directory compares the candidate address with all addresses now in the cache. To maintain high speed, this operation must be done as quickly as possible, which should be within one machine cycle. Furthermore, a cache memory is called set associative if the cache is partitioned into distinct sets of lines, each set containing a small fixed number of lines. In this scheme, each address reference is mapped to a particular set by means of a simple operation on the address. If the address is in the cache, then it is stored as one of the lines in the set. Therefore, the cache need not be searched in its entirety. Only the set to which the address is mapped needs to be searched. If a match is found, then the corresponding data line of the cache is gated to the cache output-data buffer, and from there it is transmitted to the computational unit. In summary, there are three parameters for characterizing a cache, namely the number of bytes per line, the number of lines per set and the number of sets. A cache in which the directory search covers all lines in the cache is said to be fully associative, which corresponds to the case when the number of sets is 1.

In the cache memory some active portion of the low-speed main memory is stored in duplicate. When a memory request is generated, the request is first presented to the cache memory, and if the cache cannot respond, the request is then presented to main memory. If an item is not resident in the cache but in the main memory, this constitutes the above mentioned cache miss. Assuming e.g. that a tag 0124X is not present, then a reference to address 01243 produces a miss for the cache since no tag matches this address. The item is then retrieved from main memory and copied into the cache. During the short period available before the main-memory operation is complete, some other item in cache is removed from the cache to make room for the new item. Special replacement algorithms deal with the cache-replacement decision. A well known strategy is the LRU (least recently used). According to the LRU replacement algorithm a cache line which was not used for the longest time will be overwritten by a page from the main memory.

A similar situation exists when fetching data from the main memory 30, except that the lack of the requested data is referred to as a page fault. In the event of a page fault, new page containing the requested data must be loaded from the disk drive 40, and another page in the memory must be discarded in order to make room for the new page. The main memory therefore also has a dedicated replacement algorithm.

It is understandable that a primary goal of designing a memory system is to avoid misses as far as possible, and it is equally understandable that one aspect in this connection is the choice of an appropriate replacement algorithm at each level.

Misses in caches can be classified into four categories: conflict, compulsory, capacity and coherence misses (see e.g. N. P. Jouppi: Improving Direct-Mapped Cache Performance by the Addition of a Small Fully-Associative Cache and Prefetch Buffers. The 17$^{th}$ International Symposium on Computer Architecture Conference proceedings (ISCA-17), 1990) internet-publication http://www.research.digital.com/wrl/techreports/abstracts/TN-14.html). Conflict misses are misses that would not occur if the cache was fully-associative and had LRU replacement. Compulsory misses are misses required in any cache organization because they are the first references to an instruction or piece of data. Capacity misses occur when the cache size is not sufficient to hold data between references. Coherence misses are misses that occur as a result of invalidation to preserve multiprocessor cache consistency.

One obvious way of reducing the number of capacity and compulsory misses is to use longer line sizes, i.e. to increase the capacity of the memory. However, line sizes cannot be made arbitrarily large without increasing the miss rate and greatly increasing the amount of data to be transferred.

Another concept that complements the concept of the replacement algorithm is prefetching (see e.g. "Rechnerarchitektur" by J. L. Hennessy and D. A. Patterson, Vieweg Verlag). Prefetching means that an algorithm is implemented for selecting data units in expectation of their being requested later. In other words, in the example of a cache, this means that not only is the cache line loaded that contains data belonging to miss, but one or more further cache lines are loaded, where the rules for choosing such supplementary lines are determined by the prefetch algorithm. These rules are associated with some sort of concept of prediction for the future behaviour of the system. Prefetch techniques are interesting because they can be more adaptive to the actual access patterns of the program than simply increasing the cache size. This is especially important for improving the performance on long quasi-sequential access patterns such as instruction streams or unit-stride array accesses.

Fetch prediction is the process of determining the next instruction to request from the memory subsystem. Branch prediction is the process of predicting the likely out-come of branch instructions. A well known fetch and branch prediction mechanism (see e.g. B. Calder, D. Grunwald: Next Cache Line and Set Prediction, The 22th International Symposium on Computer Architecture Conference proceedings (ISCA-22), 1995, internet-publication http://www-cs.ucsd.edu/~calder/abstracts/ISCA-NLS-95.html) is the use of branch target buffers (BTB), for which the Intel Pentium is an example. The Intel Pentium has a 256-entry BTB organized as four-way associative cache. Only branches that are "taken" are entered into the BTB. If a branch address appears in the BTB and the branch is predicted as taken, the stored address is used to fetch future instructions, otherwise the fall-through address is used. For each BTB entry, the Pentium uses a two-bit saturating counter to predict the direction of a conditional branch. In this BTB architecture the branch prediction information (the two-bit counter), is associated or coupled with the BTB entry. Thus, the dynamic prediction can only be used for branches in the BTB, and branches that miss in the BTB must use less accurate static prediction. In other words, the BTB keeps a dynamic record of branch events.

From the same paper by B. Calder and D. Grunwald an alternative computer system having a cache memory with a fetch and branch prediction mechanism is known. The instruction following a branch is fetched by using an index into the cache, which is called a next cache line and set (NLS) predictor. An NLS predictor is a pointer into the instruction cache, indicating the target instruction of a branch. The NLS predictor is either decoupled from the cache line and is stored in a separate tag-less memory buffer (referred to as an NLS-table), or is directly stored together with the cache lines (referred to an NLS-cache). It is assumed that during the instruction fetch stage of the pipeline, each instruction can easily be identified as a branch or non-branch instruction. This can be done either by providing a distinguishing bit in the instruction set or storing that information in the instruction cache.

For the next instruction fetch there are three predicted addresses available. These are the NLS predictor, the fall-through line (previous predicted line+fetch size) and the top of a return stack, e.g. with instructions after a return from a subroutine. The NLS predictor on the other hand contains three fields, the type field, the line field and the set field. The type field shows the possible prediction sources, namely a conditional branch, other types of branches, the return instruction and an invalid bit for an invalid NLS predictor. The line field contains the line number to be fetched from the instruction cache. The set field is used to indicate where the predicted line is located if a multi-associative cache is used. It is not needed for a direct mapped cache.

If the instruction being fetched from the instruction cache indicates that it is a branch instruction, the NLS predictor is used and the type field is examined to choose among the possible next fetch addresses. Return instructions use the return stack. Unconditional branches and indirect branches use the cache line specified by the NLS entry. If the type field indicates a conditional branch, the architecture uses the prediction given by a pattern history table (PHT) which combines the history of several recent branches to predict the outcome of a branch.

If the branch is predicted as taken, the NLS line and set fields are used to fetch the appropriate cache line and instruction from the instruction cache. If the conditional branch is predicted as not-taken, the pre-computed fall-through line address is used on the next instruction fetch.

The NLS entries are updated after instructions are decoded and the branch type and destinations are resolved. The instruction type determines the type field and the branch destination determines the set and line field. Only taken branches update the set and line field, but all branches update the type field. A conditional branch which executes the fall-through does not update the set and line field, so that the pointer to the target instruction is not erased. For conditional branches, this allows the branch prediction hardware to use either the NLS predictor for taken conditional branches or to use pre-computed fall-through line, depending on the outcome of the PHT.

From M. Johnson: Superscalar Microprocessor Design, Prentice Hall, Englewood Cliffs, N.J., 1990, pages 71–77, a branch prediction is known which is based on special instruction-fetch information included in the cache entries. The fetch information contains a conventional address tag and a successor index field as well as a branch block index field. The successor index field indicates both the next cache block predicted to be fetched and the first instruction within this next block predicted to be executed. The branch block index field indicates the location of a branch point within the corresponding instruction block.

To check each branch prediction, the processor keeps a list in an array of predicted branches ordered by the sequence in which branches were predicted.

When a branch is executed, the processor compares information related to this branch with the information at the front of the list of predicted branches, which is the oldest predicted-taken branch. The following conditions must hold for a successful prediction:

If the executed branch is taken, its location in the cache must match the location of the next branch on the list of predictions.

If the location of the executed branch matches the location of the oldest branch on the list of predictions, the predicted target address must equal the next instruction address determined by executing the branch.

If either of the foregoing conditions does not hold, the instruction fetcher has mispredicted a branch. The instruction fetcher uses the location of the branch determined by the execution unit to update the appropriate cache entry.

From the above mentioned article by Jouppi a memory hierarchy having a first level cache, a second level cache, and so called stream buffers in between is known. A stream buffer consists of a series of entries, each consisting of a tag, an available bit, and a data line. When a miss occurs in the cache that is at a higher hierarchical level than the stream buffer, the stream buffer begins prefetching successive lines starting at the miss target, from the memory element provided at a lower hierarchical level, e.g. a lower level cache. As each prefetch request is sent out, the tag for the address is entered into the stream buffer, and the available bit is set to false. When the prefetch data returns, it is placed in the entry with its tag and the available bit is set to true.

The stream buffers are considered as FIFO queues, where only the head of the queue has a tag comparator and elements removed from the buffer must be removed strictly in sequence without skipping any lines. A line miss will cause a stream buffer to be flushed and restarted at the miss address even if the requested line is already present further down in the queue.

Furthermore, Jouppi also mentions more complicated stream buffers which can provide already-fetched lines out of sequence. Such a stream buffer that also has comparators for other entries than the head of the queue, is referred to as a quasi-sequential stream buffer. Also, an arrangement is disclosed in which a number of stream buffers are connected in parallel, and when a miss occurs in the high level cache, all of the parallel stream buffers are searched. Such a parallel arrangement is referred to as a multi-way stream buffer. When a miss occurs in the data cache that does not hit in any stream buffer of the plurality, the stream buffer hit least recently is cleared (i.e., LRU replacement) and it is started fetching at the miss address.

Subsequent accesses to the cache also compare their address against the first item stored in the buffer. If a reference misses in the cache but hits in the buffer the cache can be reloaded in a single cycle from the stream buffer.

In summary, the Jouppi reference discloses placing a stream buffer between a first level cache and the next slower memory in the hierarchy, where a prefetch from said slower memory is initiated by a cache miss. The reference by Calder and Grunwald discloses the use of an NLS predictor, where prefetching is always conducted in accordance with this predictor.

Although the above mentioned prefetch mechanisms can already handle flow control, these mechanisms still show a decrease in computing speed if there is a code with frequent and short jumps. In particular, such code portions are used for applications in telecommunications such as exchange computing.

OBJECT OF THE INVENTION

Therefore, it is an object of the invention to provide a data processing system with a hierarchical memory which shows an efficient data exchange control, especially for applications in telecommunications.

SUMMARY OF THE INVENTION

This object is solved by a data processing system according to claim 1. Advantageous embodiments are described in the dependent claims.

The first memory element can e.g. be an instruction cache memory and the data requesting element can e.g. be a processor. The data units to be read from the first memory element can be then be cache lines, but equally well be data words or any other unit suitable for the desired purpose. The data identifiers can e.g. any suitable type of address, be it physical or virtual. In this example, in which the data requesting element is a processor, the element for establishing a sequence of data identifiers is the program counter in the processor, where said program counter defines a sequence of instruction data identifiers, i.e. instruction addresses. Although this is a preferred embodiment that will be described in detail further on, it may be noted that the data requesting element could itself comprise a memory that requests data from a lower level memory, where the element for establishing a sequence of data identifiers could then again be the program counter, but could also be any other suitable control element that determines a sequence as specified in claim 1. In other words, the present invention is by no means restricted to being implemented at the highest level of the memory hierarchy (i.e. next to the processor), but can also be implemented between lower level elements in the hierarchy.

The second memory element is provided between the first memory element and the data requesting elements in terms of the hierarchy. In other words, the data requesting element provides data requests (e.g. a desired instruction address) to the second memory element, where the desired data is supplied if it is present in the second memory element (i.e. in case of a hit), and where a demand for this desired data is provided to the first memory element if the data is not present (i.e. in case of a miss). It may be remarked that in the present specification and claims, for the purpose of clarity, the term "request" will refer to data asked for by the data requesting element, and the term "demand" will refer to data asked for by the second memory element. It should be noted that the data request issued by the data requesting element can be identical to the data demand issued by the second memory element, e.g. one and the same virtual address, but it is equally well possible that the demands use a different addressing scheme than the requests.

The second memory element is preferably a stream buffer as described in the Jouppi reference, and more preferably a quasi-sequential multi-way stream buffer. However, it is clear that any suitable storage means can be used, e.g. a simple flip-flop could also be used, or the second memory element could also be arranged and organized like a cache memory.

In accordance with the present invention, the second memory element is operable to perform a prefetch procedure for data units from said first memory element. A first sub-procedure performs a prefetch in accordance with a prefetch data identifier stored in association with a given data unit. More specifically, upon detecting a first predetermined change in status of the second memory element, a first given data unit is determined in the second memory element, which is associated with this first predetermined change in status. The predetermined change in status can for example be the reading out of a data unit from the second memory element, in which case the given data unit can be the data unit that was read out, or the predetermined change in status can be the loading of a data unit into the second memory element, in which case the given data unit can be the data unit that was loaded.

Then it is checked if the first given data unit fulfils a predetermined condition, where the predetermined condition relates to a prefetch data identifier stored in association with said first given data unit. The prefetch data identifier identifies a different data unit than said first given data unit. In other words, the prefetch identifier is not the address of the given data unit, but much rather the address of another data unit.

The storage of the prefetch data identifier in association with a data unit can be arranged in any desired way, e.g. together with the data unit itself but as separate units, together with the data unit and as a part of the data unit, or in a separate table using the data identifier (address) of the given data unit as a reference.

The predetermined condition that relates to the prefetch data identifier can be the simple checking if such an identifier is present at all, e.g. by checking a specific field that is reserved for the prefetch data identifier (be it in the data unit itself or in a separate table) contains data other than zero, or the predetermined condition can also be the checking of a specific indicator, such as a prefetch data identifier valid bit. If the predetermined condition is fulfilled, at least the data unit identified by the prefetch data identifier is fetched. "At least" means that other data units may also be fetched together with the data unit identified by the prefetch data identifier, for example data units identified by data identifiers following the prefetch data identifier in the sequence, or data units following the data identifier belonging to the given data unit.

A second sub-procedure is implemented for performing a sequential prefetch. In other words, upon detecting a second predetermined change in status of said second memory element, a given data unit associated with said second predetermined change in status is determined, and at least the next data unit in the sequence of data identifiers is fetched. "At least" again means that additionally other data units may be fetched together with the next data unit, e.g. the next two or three data units. The second predetermined change in status can be completely independent of the first predetermined change in status, e.g. may involve reaching a limit related to the filling of the second memory element, such as a low water mark, or can be coupled to the first predetermined condition. An example of the latter case is that the determination of the second change of status comprises determining the first change of status. This can mean that e.g. the second change in status is determined if the first change in status is determined (e.g. a read out of a specific data unit) and an additional condition is met, e.g. that the first given data unit does not fulfil the predetermined condition (e.g. the prefetch data identifier valid bit is not set). In this case the prefetch sub-procedure on the basis of the prefetch data identifier and the sequential sub-procedure are operated alternatively. But it is equally well possible that the additional condition is identical to the first predetermined condition, namely that this condition is met (e.g. the prefetch data identifier valid bit is set), such that the two sub-procedures are conducted in conjunction.

As described above, the present invention comprises a prefetching concept that involves both sequential prefetch and prefetch in accordance with a prefetch data identifier. Each are conducted under a corresponding condition, where the conditions may be different, coupled or the same. This provides great flexibility and efficiency. Especially, it is possible to simultaneously cope both with program jumps and with sequential procedure in a simple and effective manner, as the prefetch procedure takes both situations into account.

It may be noted that although the Jouppi reference teaches the use of stream buffers, these stream buffers are placed between a cache and the next slower memory and controlled in accordance with the contents and status of the cache. The present invention, when applied to the situation described by Jouppi, would consist in placing the second memory element between the cache and the processor, i.e. above the cache, not below. Also, the prefetch indicated in the Jouppi reference is only initiated in the event of a miss in the cache, such that the system of the present invention is far more flexible. The reference by Calder and Grunwald teaches always using an NLS predictor with respect to a prefetch, so that again no flexibility is achieved.

The process of allocating certain prefetch data identifiers to certain data units and/or their respective data identifiers and not allocating such prefetch data identifiers to other data units, i.e. the selection of certain data units as having a prefetch data identifier and the validation of specific prefetch data identifiers can in principle be done in any suitable or desirable way. According to a preferred embodiment, this is done by introducing a third memory element for storing data identifiers that identify the data most recently requested by the data requesting element. These data identifiers are stored in the order of their last having been requested.

The management or updating of the prefetch data identifiers stored in association with certain data units is then accomplished by performing a procedure such that if data identified by a data identifier provided by the data requesting element to said second memory element as a data request is not present in said second memory element (i.e. in the event of a miss), the data identifier for which no related data is present in said second memory element is associated with a data identifier belonging to a previous request stored in the third memory element, and then the data identifier for which no related data is present in said second memory element is stored as a prefetch data identifier in association with the data unit in said first memory element identified by said previous data request identifier.

Preferably the third memory element will simply queue a predetermined number of data identifiers that belong to the last data units read out of the second memory element. If a miss occurs in the second data memory, then the data identifier (address) identifying the data unit that missed will be "written back" as a prefetch data identifier to one of the previous data identifiers in the queue of the third memory element. As is understandable, each of the data identifiers in the third memory element identifies a hit. The depth of writing back (i.e. will the data identifier be associated with the last data unit read out, the second last, the third last . . . etc.) depends on the specific system, such as on the latency etc. The depth of the third memory element (i.e. the number of queued identifiers) and the depth of writing back should be chosen appropriately. Namely, by performing the above write back procedure in the event of a miss in the second memory element, a connection is established between the previous data unit and the present data unit. As the miss of the present data unit is an indication of a jump, using the data identifier of the missed data unit as a prefetch data identifier for the previous data unit provides a selective record of this jump, such that the chances of avoiding the miss in the wake of the next request for the previous data unit are greatly diminished, at least assuming that it is probable that the same jump will be performed.

BRIEF DESCRIPTION OF FIGURES

The invention will now be described by way of preferred embodiments, which serve to exemplify the invention but should by no means be seen as restrictive, and with reference to the accompanying drawings in which.

DETAILED DESCRIPTION OF THE PREFERRED EMBODIMENTS

Figure 1:
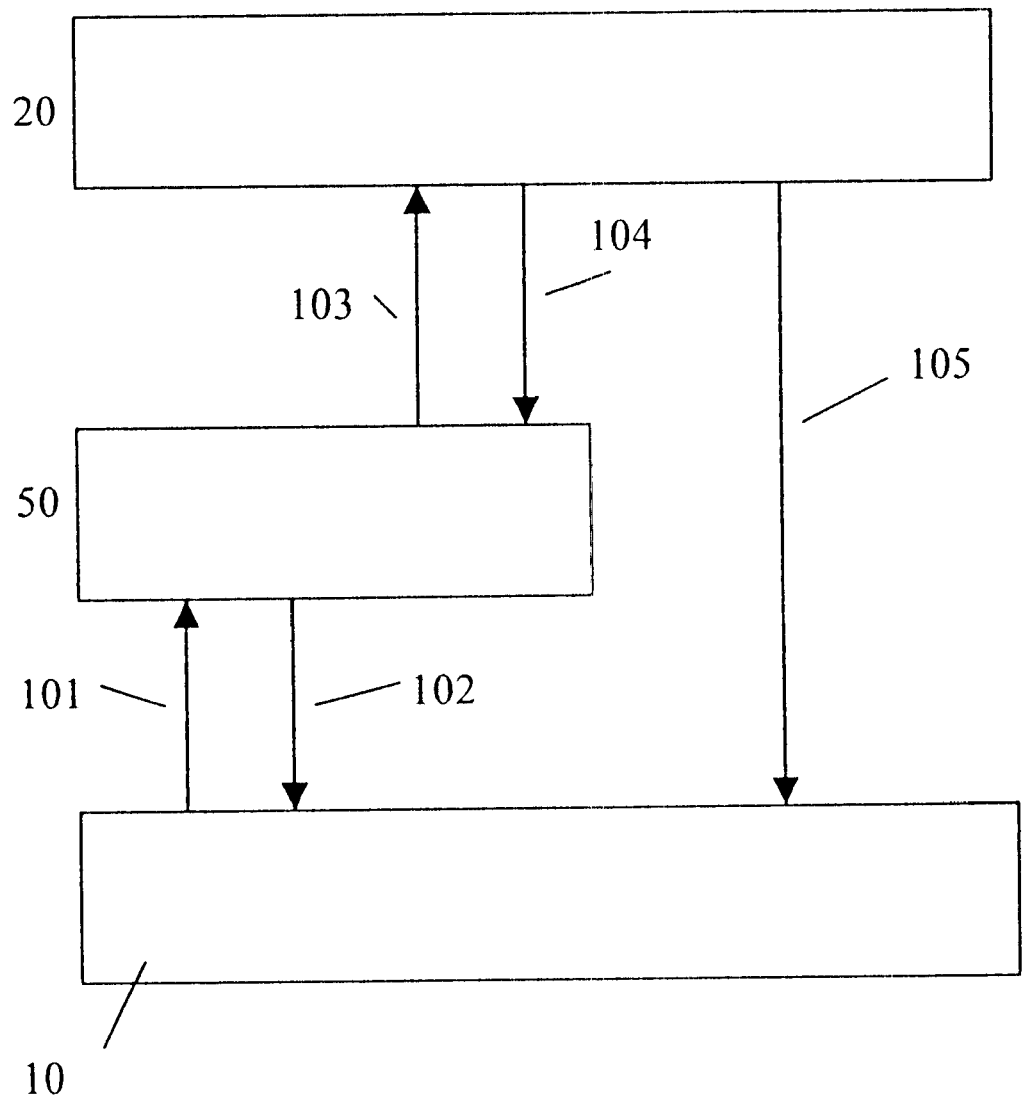
FIG. 1 shows a basic arrangement of a data processing system of the invention.

FIG. 1 shows a basic data processing system that can be 0arranged to operate in accordance with the present invention. Reference numeral 10 represents a data requesting element. Reference numeral 20 represents a first memory element and reference numeral 50 represents a second memory element that is provided between element 10 and 20 in terms of memory hierarchy. In other words, data requesting element 10 sends a data request 101 to the second memory element 50. If the requested data is present in element 50, then it is provided to the data requesting element 10, as indicated by arrow 102. If the requested data element is not present in the second memory element 50, then a data demand 103 is sent to the lower level memory 20, which can then provide the demanded data to the element 50 and the element 10 simultaneously, as represented by arrows 104 and 105. Naturally, it is also possible that the data is only provided to element 50 or only to element 10.

According to a preferred embodiment of the invention, the data requesting element 10 is a processor, the first memory element 20 is an on-chip instruction cache memory, and the second memory element 50 is a buffer type memory than can queue a number of data units read from the instruction cache 20.

The data units read from instruction cache 20 may be cache lines, but can equally well be data words or intermediate units between a word and a cache line. The definition of a specific data unit will depend on the specific application.

Figure 2:
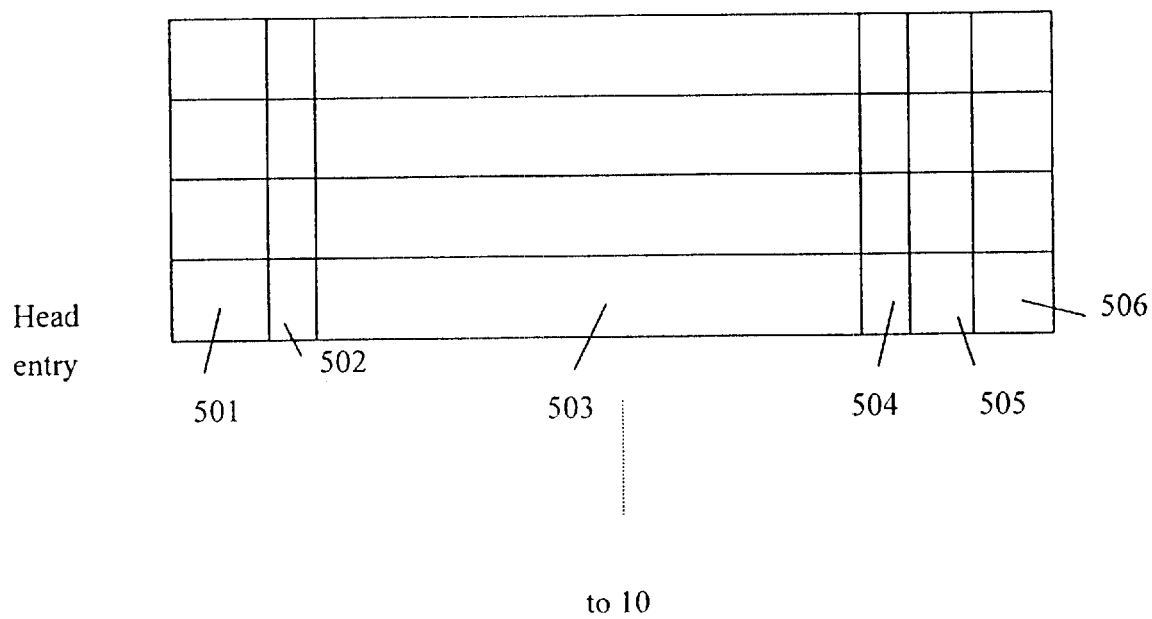
FIG. 2 is a schematic representation of a stream buffer used in the present invention.

FIG. 2 shows a schematic representation of the second memory element 50, where this second memory is implemented as a stream buffer memory 50. Each entry in the stream buffer consists of a tag 501, which identifies the data unit stored in the data unit 503. Typically, the content of the tag will simply be the address used in the context of the addressing scheme (or schemes) in the memory system. In other words, the tag 501 will typically contain the data identifier that identifies the data unit in unit 503. Additionally, an entry may also contain an availability field 502, where this field can e.g. be a single bit. An availability "NO" indicates that the data unit identified in field 501 is not available in field 503. On the other hand, an availability of "YES" indicates that the data unit identified by field 501 is available in field 503.

As shown in FIG. 2, additional fields 504–506 may also be provided. As an example, field 505 may contain the prefetch data identifier associated with the data unit in field 503, in the event that the data unit in field 503 is associated with a prefetch data identifier (as will be explained further on, not every data unit will be associated with a prefetch data identifier). Field 504 can then e.g. contain a prefetch data identifier valid indicator, which provides for the possibility of performing a further parameter check before using the prefetch data identifier in field 505.

A prefetch data identifier is an identifier that identifies a data unit different from the data unit with which is associated. The prefetch identifier is a type of predictor.

Finally, further types of information and indicators can be stored in an entry of the buffer 50, which is exemplified by the additional field 506. The shown structure of an entry is only an example for the purpose of explanation and the buffer entry can contain a smaller or larger number of fields than shown in FIG. 2.

It is important to note that the contents of the shown field 505, namely the prefetch data identifier, can also be part of the data unit itself (in which case there is no field 505), that is contained in field 503, i.e. it is possible that the prefetch data identifier associated with a given data unit (e.g. a specific line in cache 20, or a data word) is part of said data unit. In this case, the prefetch data identifier is automatically loaded together with the data unit.

A determination with respect to the presence or condition of the prefetch data identifier for a data unit contained in field the 503 identified by the tag 501 is then easily conducted on the basis of the information contained in the buffer entry. For example, if it is to be determined if a prefetch data identifier is associated with a given data unit in the buffer, then it is only necessary to check field 505 (if such a field is present) or to check a corresponding location in the data unit stored in field 503 (if the prefetch data identifier is a part of said data unit).

In the above embodiment, it was mentioned that the prefetch data identifiers are stored together with the data units in the cache 20, such that a prefetch data identifier is necessarily loaded together with its associated data unit. According to another embodiment, the prefetch data identifiers are not stored together with the data units in the cache 20, but are much rather stored in a separate table, where the prefetch data identifiers are referenced by the data identifiers that identify the corresponding data unit. Then, when a data unit is loaded into buffer 50, it is possible to simultaneously access the table, in order to set the corresponding prefetch data identifier from the table in field 505 of the buffer entry belonging to the loaded data unit, if a corresponding prefetch data identifier is present. Then, if a determination is to be made with respect to the presence or absence of a prefetch data identifier, it is only necessary to check field 505.

It should, however, be noted that it is not necessary to provide a field 505 in the buffer 50. Much rather, also when using the separate table for storing prefetch data identifiers, it is possible to only access the table when conducting a determination with respect to the presence or absence of a prefetch data identifier associated with a given data unit. Namely, if it is to be determined if a prefetch data identifier exists for a data unit in field 503, said data unit being identified by tag 501, then the address in tag 501 is used to look up in the table, in order to determine if a preset data identifier is associated with the address that identifies the given data unit.

The operation of buffer 50 is such that when receiving a request 101, which will contain the address of desired data as a data identifier, then this address shall be used for determining if the requested data is present in buffer 50.

If the requesting element 10 requests data by using addresses that are contained in the tags 501, the requested address is simply compared with each of the tags in buffer 50, and it is determined if one of the tags matches. It is, however, also possible that the data requesting element uses a different addressing scheme than the buffer 50, e.g. that the requesting element 10 sends out virtual addresses defined on a virtual address space, whereas the buffer 50 tags each data unit in the same way that the cache tags bits lines. In this case, an appropriate translation or mapping mechanism must be implemented. Such mapping mechanisms are well known in the art, e.g. in connection with cache memories, such that a further explanation is not necessary here (see e.g. above reference by Hennessy). It should also be remarked that a mixed addressing scheme can be used, i.e. that the data requesting element sends different types of addresses, where one type needs to be mapped and the other does not. All such various addresses or address types fall under the term data identifier.

It is basically possible that the comparison between a tag 501 and the address of a data request received from element 10 is only conducted for the tag 501 of the head entry. In this case, the buffer 50 would be a sequential buffer, as only the head entry could be read out. Preferably, the buffer is however arranged to be a quasi-sequential buffer, which means that a comparison between the address of a data request and the tag 501 can be conducted for any of the tags in buffer 50, e.g. for the four tags shown in FIG. 2. In other words, the stream buffer is arranged such that a comparison can be conducted for any entry of the queue.

It should be noted that FIG. 2 is only a schematic example and that a real stream buffer may have more entries.

Figure 3:
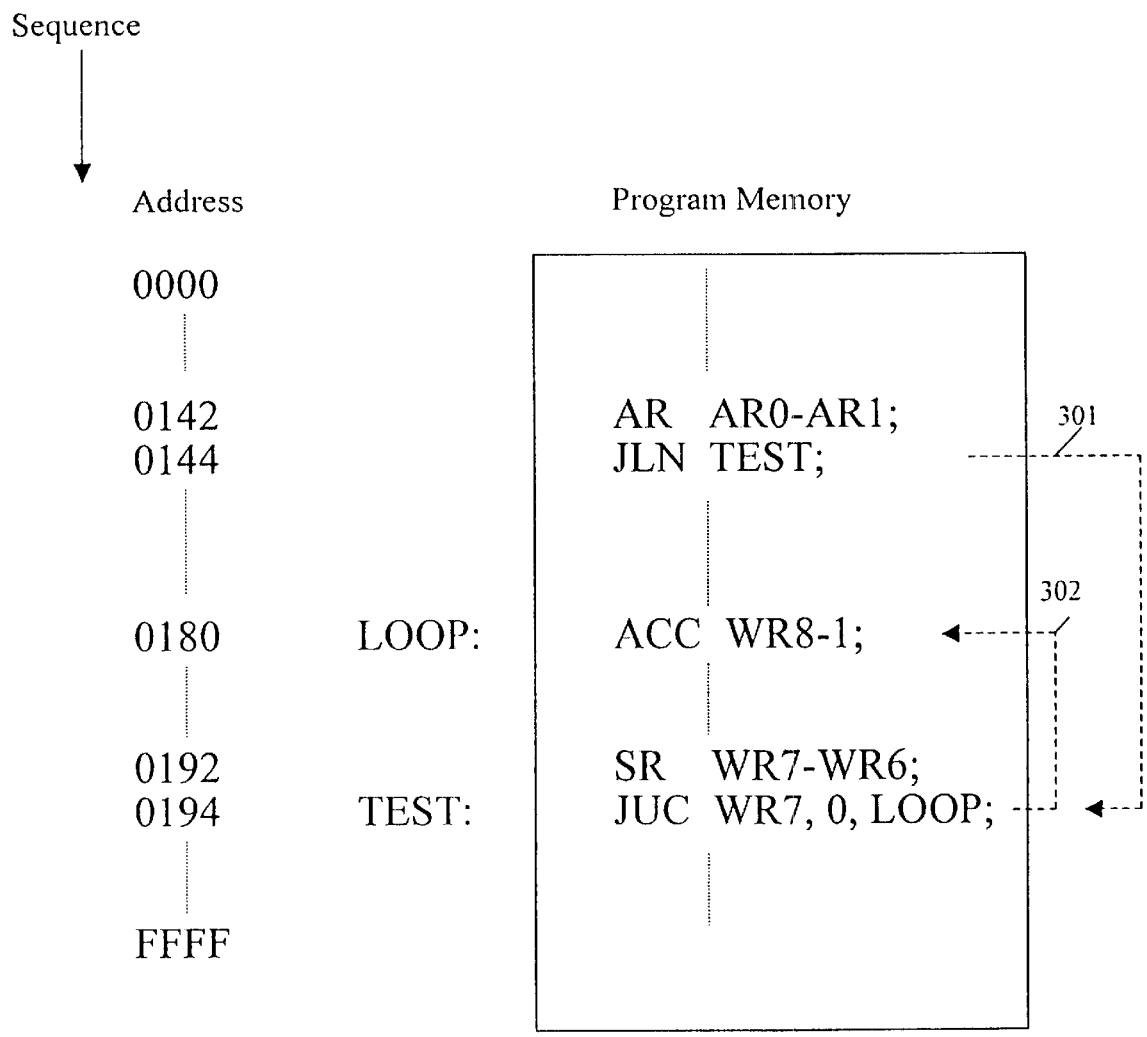
FIG. 3 is a schematic representation of the sequence of instruction addresses produced by a program counter and showing jumps in said sequence.

FIG. 3 is a simple representation that serves to explain the generation of a sequence of addresses by a program counter in data requesting element 10. The left hand side shows a sequence of addresses represented in hex-code. The right hand side schematically shows the contents of a program memory containing instructions corresponding to the addresses. It may be noted that the shown instructions are only an arbitrary example. The dotted vertical lines indicate portions that are not shown. The program usually proceeds consecutively according to the sequence of addresses, e.g. from 0140 to 0142 to 0144 etc., except if an instruction leads to a jump, be it a forward jump or a backward jump, e.g. in the event of a branching in the program. FIG. 3 shows two such jumps, namely a forward jump 301 from address (or code line) 0144 to 0194, and a backward jump 302 from address 0194 to 0180. Therefore, the jump 301 means that the data requesting element (the processor) will call the instruction belonging to 0194 after the instruction belonging to address 0144. In other words, the procedure jumps over addresses 0146 to 0192. Equally, the jump 302 means that after having requested the instruction corresponding to address 0194, the processor will request the instruction corresponding to address 0180.

Although the example of FIG. 3 shows a sequence of consecutively ordered identifiers, it may be noted that this is only an illustrative example. The sequence could also contain arbitrarily ordered addresses or identifiers.

Figure 4:
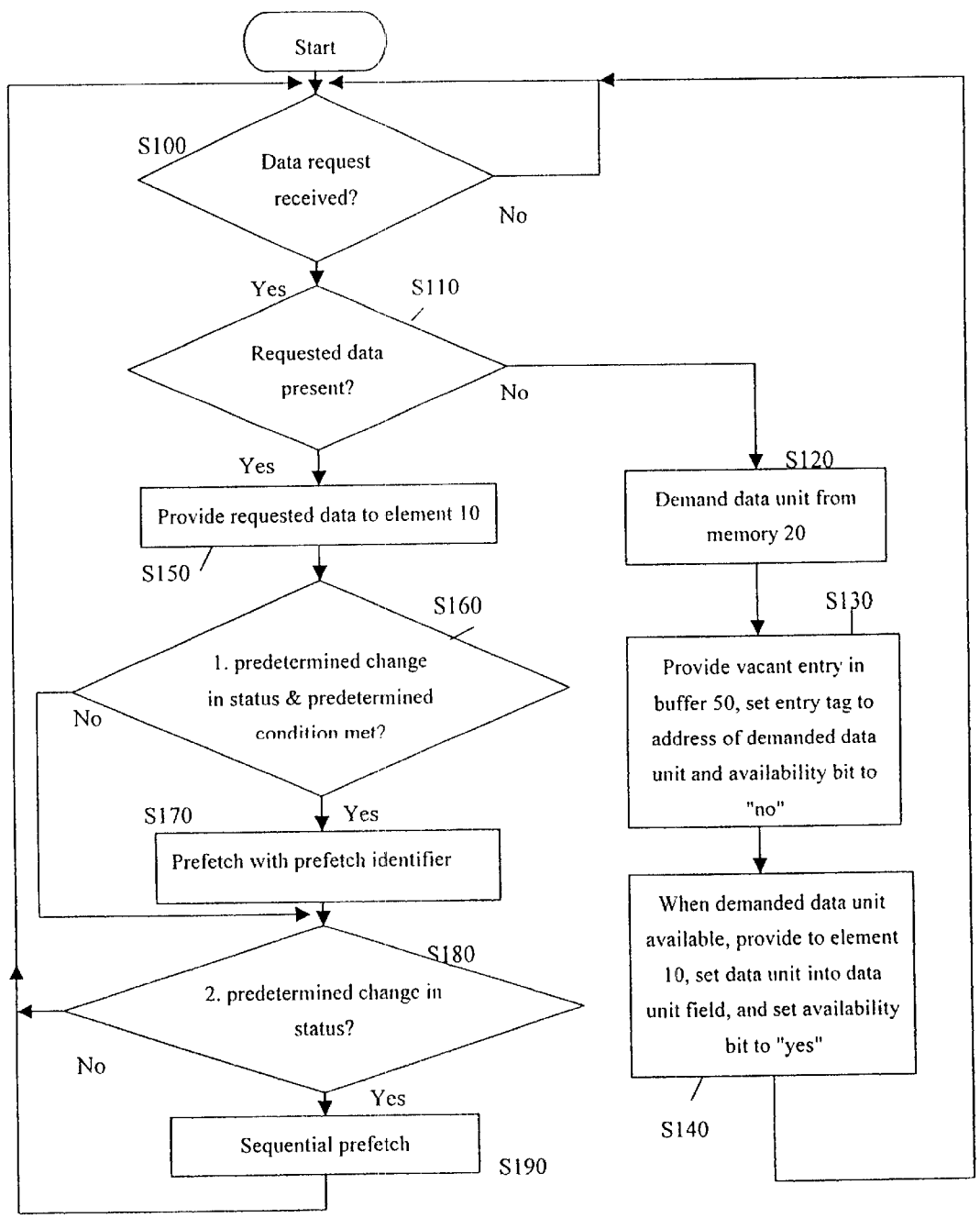
FIG. 4 is a flowchart showing a basic embodiment of the method of the present invention.

Now, the basic operation of the system shown in FIG. 1 shall be explained by referring to the flow-chart of FIG. 4. In a first step S100 it is determined if a data request has been received in the stream buffer 50, e.g. if the processor 10 has requested data. If this is the case, step S110 determines if the requested data is present. As already explained previously, this can e.g. be done by comparing the address indicated in the data request with the tags 501 of the entries in buffer 50. If the requested data is not present, then step S120 specifies that a demand is sent to lower level memory 20, i.e. the cache (see arrow 103 in FIG. 1). Then, in step S130 a vacant entry is provided in buffer 50. A vacant entry can be provided by either finding an empty entry, or by deleting an entry if the buffer is full. If the buffer is full, then a suitable selection algorithm will be invoked such as an LRU algorithm (LRU=least recently used) or an algorithm based on the LRU concept. A number of such LRU based algorithms are known in the art of memory management and sometimes also referred to as pseudo-LRU algorithms, such that no further description is necessary here.

In step S130, the identifying tag (501 in FIG. 2) of the vacant entry is then set to the address or data identifier of the demanded data unit but the availability indicator (502 in FIG. 2), which is e.g. just a simple bit, is set to "NO" (e.g. in the case of a bit, the bit setting "0" can be interpreted as "NO"). Due to the operation of step S130, a subsequent request for the same data unit is recorded as a hit, because a corresponding matching tag can be found in the buffer 50. Naturally, the providing of the corresponding data unit to the processor 10 must still wait until the data unit is actually available. However, this mechanism avoids multiple misses on the same data unit.

When the demanded data unit becomes available (which depends on the cycle period, the access speed of memory element 20 etc.), the data unit is provided simultaneously to buffer 50 and processor 10 (arrows 104, 105 in FIG. 1), where the provided data unit is set into the data unit field (503 in FIG. 2) and the corresponding availability indicator is set to "YES" (in the above example, in which the indicator was a bit and "0" indicated "NO", the bit is then set to "1").

Then the procedure loops back to step S100.

If step S110 determines that the requested data is present, then the requested data is provided to requesting element 10 in step S150 (arrow 102 in FIG. 1). Furthermore, as indicated by steps S160 to S190, the data processing system of the present invention is operable to perform a specific prefetch procedure. In step S160 it is determined if a first predetermined change in status has occurred, and if a predetermined condition has been met. Then a first given data unit in the buffer that is associated with the first predetermined change in status is determined. An example of such a predetermined change in status can be the reading out of a data unit or the loading of a data unit. The first given data unit is then accordingly the read-out data unit or the loaded data unit, respectively. The predetermined condition relates to a prefetch data identifier stored in association with the given data unit. In other words, in a preferred example, it is simply checked if the given data unit is associated with a prefetch data identifier. For example, field 505 as shown in FIG. 2 is checked and if the contents are different from "0" it is determined that a prefetch data identifier is present, such that the predetermined condition is fulfilled. As an alternative, the predetermined condition can also consist in the prefetch data identifier valid indicator being set to "YES" (see field 504 in FIG. 2).

If the predetermined condition is fulfilled, then a prefetch on the basis of the prefetch data identifier associated with the given data unit is performed (Step S170). In other words, the prefetch data identifier is e.g. an address that points into the lower level memory level or cache 20, and at least the data unit (e.g. cache line) identified by this prefetch data identifier is then loaded into the buffer 50. The process of loading the prefetched data unit will be conducted as already described in connection with step 130. Namely, a vacant entry is provided, the entry tag is set to the prefetch data identifier and the availability identifier is set to "NO", until the data unit identified by the prefetch data identifier is available, where upon the availability indicator is set to "YES".

It may be noted that in accordance with the present invention at least the data unit identified by the prefetch data identifier is loaded, which means that naturally other data units can also be loaded additionally in the course of the prefetch step. For example, a given number of data units that follow the data unit identified by the prefetch data identifier in the sequence of instructions (see FIG. 3) can also be loaded. Such a loading of a series will be referred to as a path further on.

If the predetermined change in status in step S160 has not occurred or the predetermined condition is not fulfilled, then step S170 is skipped and the procedure goes to step S180, in which it is determined if a second predetermined change in status has occurred. The second predetermined change in status can be completely independent of the determination that is performed in step S160, or can be coupled with the determination of step S160. This shall be explained in more detail by referring to the detailed embodiments of FIGS. 5, 6 and 7.

If the determination of Step S180 is positive, a second given data unit is determined, which is associated with the second predetermined change in status, and a sequential prefetch is performed with respect to this second given data unit (step S190 in FIG. 4). For example, if the second predetermined change in status is identical to the first predetermined change in status and this change in status is the reading out of a data unit, then the sequential prefetch is performed with respect to the read out data unit. The sequential prefetch comprises prefetching at least the data unit identified by the data identifier (address) that in the given sequence (see FIG. 3) follows the data identifier of the second given data units. In other words, referring to the example of FIG. 3, if the read out data unit is identified by address 0142, then the sequential prefetch will at least load the data unit identified by address 0144. The term "at least" again implies that naturally further data units can be loaded additionally, e.g. further data units of the sequence or data units that lie out of sequence and are identified by an appropriate algorithm. The data unit prefetched sequentially is loaded as in the previous cases, namely by providing a vacant entry, setting the entry tag into the data identifier of the prefetch data unit and setting the availability indicator to "NO". When the prefetch data unit has arrived, the data unit is set into the corresponding data unit field (field 503 in FIG. 2) and the availability indicator is set to "YES". The procedure then loops back to step S100.

It should be noted that the arrangement of the various steps in FIG. 4 is only one possibility and these steps may be arranged in many different ways. For example, the steps S160 and S180 can be performed in opposite order or in parallel. Therefore, the method shown in FIG. 4 is only an example that serves to better understand the concept of the invention, but is by no means restrictive.

Example embodiments based on the method of FIG. 4 shall now be described with reference to FIGS. 5, 6 and 7. Identical steps with those already explained in connection with FIG. 4 have the same reference numerals. Their description shall not be repeated.

Figure 5:
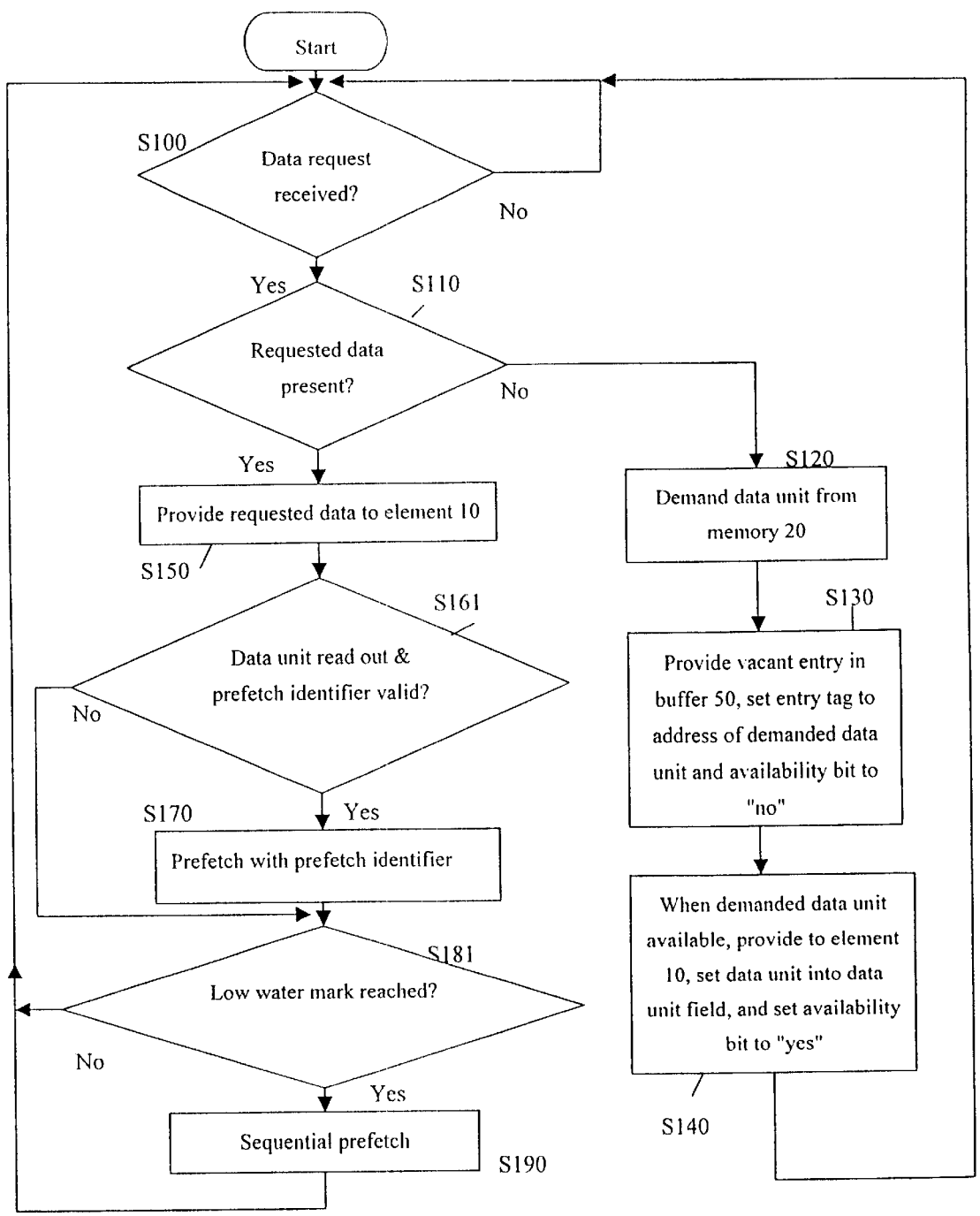
FIG. 5 is a flowchart that shows a specific embodiment based on the method of FIG. 4.

In the method of FIG. 5, step S160 of FIG. 4 is replaced by step S161 which specifies that the first predetermined change in status is given if a data unit is read out, i.e. passed to processor 10, and if the prefetch data identifier valid indicator in said read out data unit is set to "YES".

It may be noted that the setting of the prefetch data identifier valid indicator can be arranged to simply reflect the presence or absence of a prefetch data identifier in association with the given data unit. In other words, the prefetch data identifier valid indicator is set to "YES" if a prefetch data identifier is associated with the given data unit, and is set to "NO" if no such prefetch data identifier is associated. Naturally, an alternative could then be to simply check for the presence for absence of the prefetch data identifier at the appropriate location (i.e. in field 505 or in the above described table), but the advantage of additionally employing a prefetch data identifier valid indicator, e.g. a single bit, is that the checking procedure can proceed much faster.

It may also be noted that in the case of the first predetermined change in status being the reading out of a data unit, step S161 does not need to explicitly determined a data unit having been read out, because this is already given by the positive answer to step S110. Therefore step S161 will in fact only check if the prefetch identifier is valid. However, step S161 has been described in the shown way in order to provide a better comparison with the more general method of FIG. 4.

Then, if the determination of Steps S161 is positive, the data unit identified by the prefetch data identifier associated with the read out data unit is loaded (at least this data unit is loaded). If the determination of Step S161 is negative, then Steps S170 is skipped and the procedure goes to Step S181, in which it is determined if a low water mark has been reached. In other words, in the example of FIG. 5, the second predetermined change in status is completely independent of the first change of status. The reaching of a low water mark means that the filling of the buffer is checked, and if the level of filling falls below a predetermined mark, then the sequential prefetch of step S190 is performed. Taking the buffer of FIG. 2 as an example, the low water mark can e.g. be placed at the next to last position in the buffer, such that if the next to last entry (the third entry from the bottom) becomes empty, the second predetermined condition is met. In a more realistic buffer, which has a larger number of entries, it is e.g. possible to set the low water mark in the middle of the buffer. In this case, the sequential prefetch of Step S190 will preferably include more data units than just the first data unit identified by the data identifier following the identifier of the read out data unit.

Figure 6:
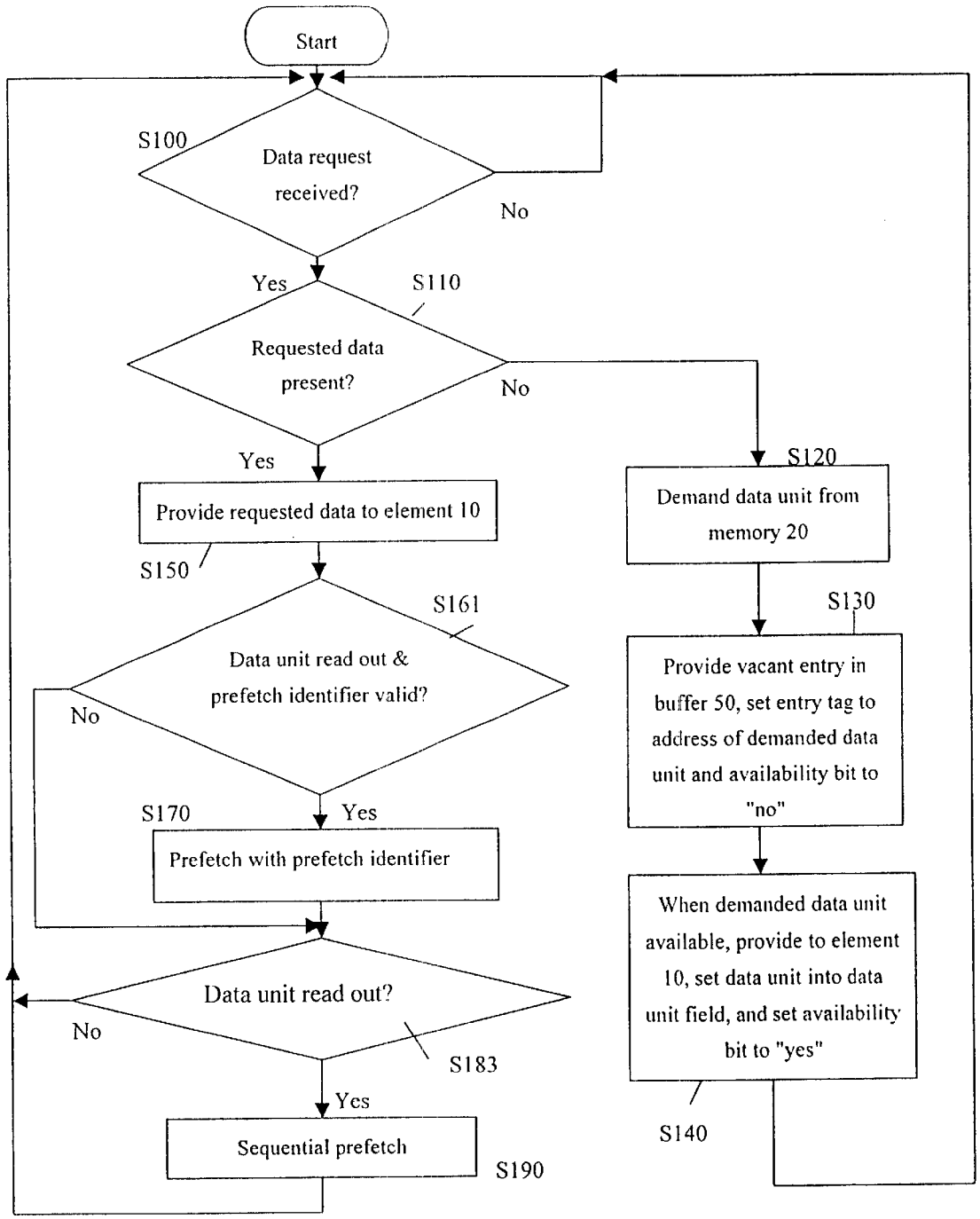
FIG. 6 shows a flowchart describing another modification of the basic method of FIG. 4.

FIG. 6 shows another variant of the method of FIG. 4. Namely, in FIG. 6 the determination of step S161 is identical to that of FIG. 5, but steps S181 is replaced by step S183. Namely, the second predetermined condition comprises the first in the sense that the second predetermined condition is fulfilled if a data unit has been read out. If this is the case, then the sequential prefetch of step S190 is performed. Due to the arrangement of the prefetch procedure as described in FIG. 6, the prefetch with the prefetch data identifier is performed if a data unit is read out and a prefetch data identifier is associated with said readout data unit, while a sequential prefetch is performed whenever a data unit is read out, regardless of a prefetch data identifier being present or not. In other words, in the event that a data unit is read out, a sequential prefetch is always performed by default, and a prefetch with a prefetch identifier is possibly performed.

It should be noted that the example of FIG. 6 could also be implemented without step S183, because the corresponding change of status (a read out) is already determined by the positive outcome of step S110. However, step S183 has been shown in order to allow a better comparison with the general embodiment of FIG. 4.

Figure 7:
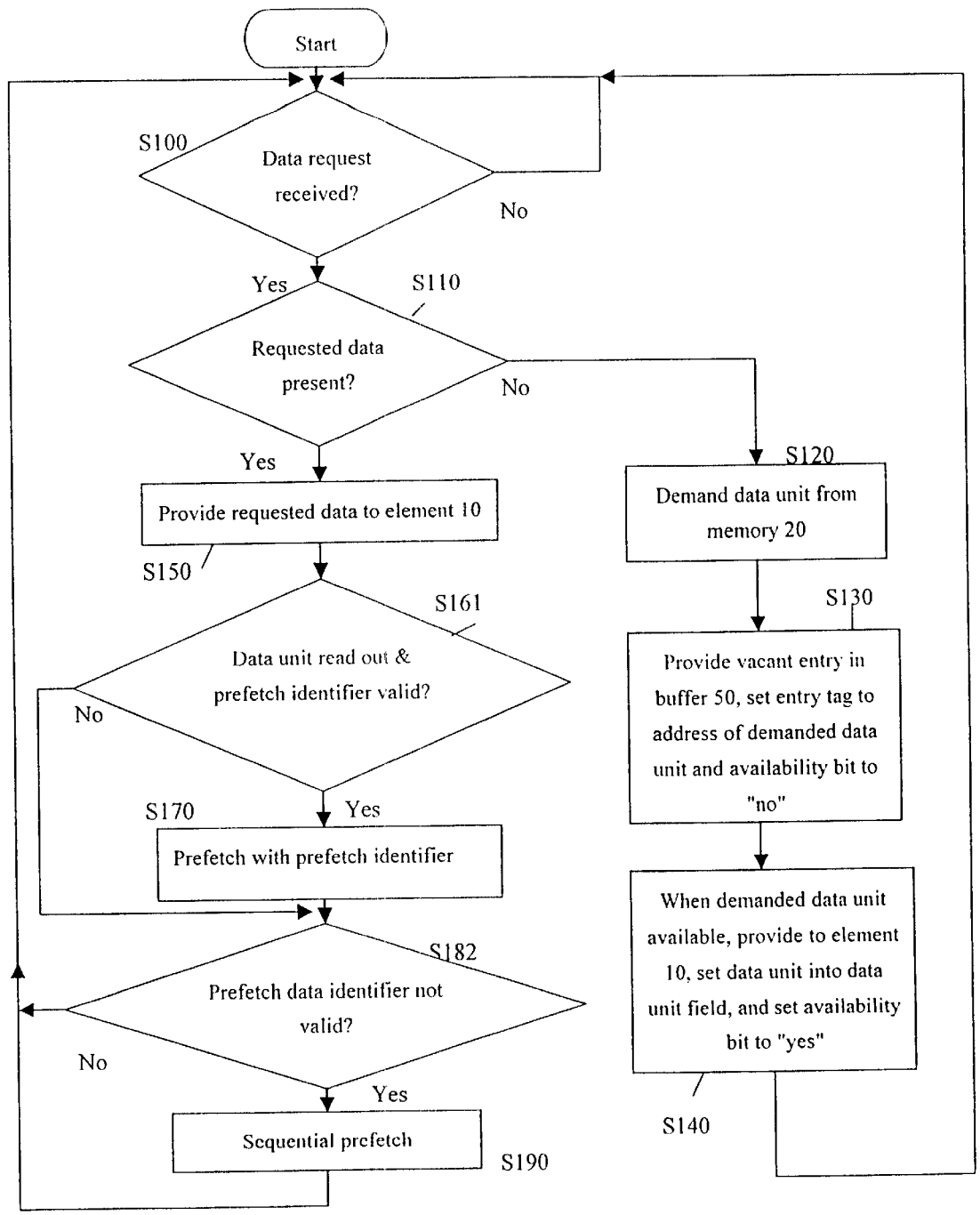
FIG. 7 shows another flowchart which is a further modification of the basic method of FIG. 4.

A further concrete realization of the general method of FIG. 4 is shown in FIG. 7. Namely, again step S161 relating to the first predetermined condition is the same as in the previous cases, but the second predetermined condition is exemplified by step S182. Namely, step S182 checks if the prefetch data identifier is not valid. In other words, if the answer in step S161 is positive, then the answer in step S182 is negative, and vice versa. Therefore, the prefetch procedure as exemplified by FIG. 7 means that the prefetch with a prefetch identifier and the sequential prefetch are performed as mutually exclusive alternatives.

The above described examples, which show the great versatility of arranging the prefetch procedure as described in claim 1, demonstrate the potential and flexibility of the inventive system.

As already mentioned previously, the embodiments described in connection with FIGS. 4 to 7 are only examples and many variations are possible. For example, the first predetermined condition can also be associated with the loading of a given data unit. In other words, the first predetermined condition is fulfilled if a new data unit is loaded. Then, the determinations regarding the presence or absence of a prefetch data identifier are conducted with respect to said loaded data unit. Also, more complicated conditions are conceivable, e.g. based on parameters that are indicative of the contents of data units loaded into the buffer 50, indicative of the contents present in the buffer 50 and/or read out of the buffer 50, or based on combinations of such parameters.

In general, it may be remarked that the individual steps shown in the above embodiments can also implemented in a different order or arrangement. For example, it is possible to perform steps S110 and S120 in parallel, i.e. to always send a demand to the memory 20 while simultaneously checking the buffer 50. Then, if the outcome of decision S110 is positive, the demanded data unit is e.g. discarded, whereas e.g. steps S130 and S140 are carried out if the outcome of step S110 is negative.

As can be seen from the above examples, a prefetch data identifier will only be associated with certain data units, but not with all data units. Preferably, the association between data units and prefetch data identifiers is conducted in such a way that the prefetch data identifiers take program jumps (see 301 and 302 in FIG. 3) into account while the sequential prefetch is arranged such that the calling of instructions in sequence will not lead to a miss in buffer 50. In other words, in this way the present invention can simultaneously cope with problems due to a program running in sequence or performing jumps.

Figure 8:
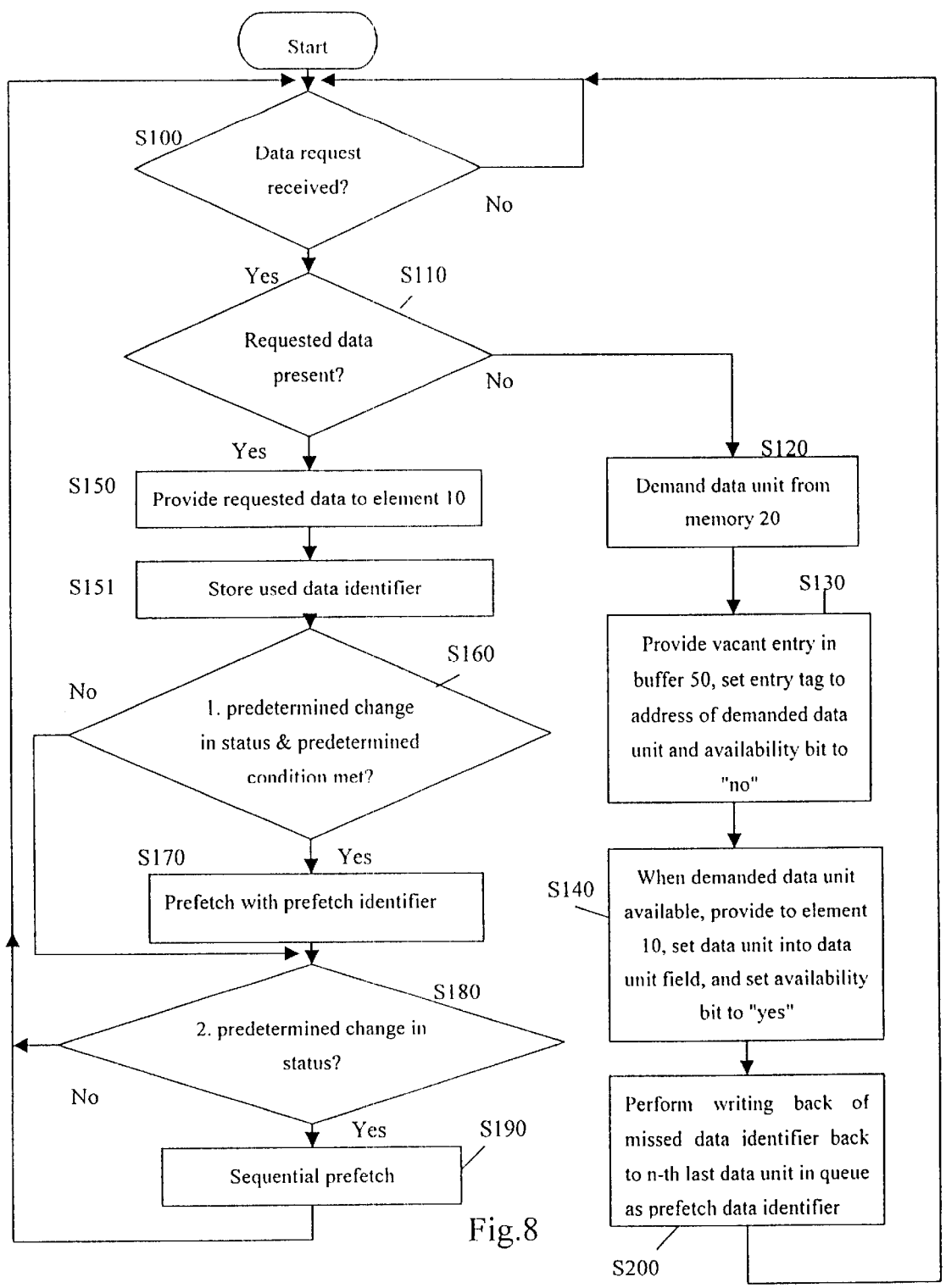
FIG. 8 is a flowchart that shows a preferred method for updating the prefetch data identifiers associated with certain data units.

A preferred method of setting and updating the prefetch data identifiers will be explained by referring to FIG. 8. FIG. 8 shows all of the steps that are explained in connection with FIG. 4, such that these steps shall not be explained again. In addition to FIG. 4, the method shown in FIG. 8 contains a step S151, in which used data identifiers are stored. In other words, after a data unit has been read out (step S150) the data identifier belonging to that data unit is stored in a simple queue or stack. The purpose of this queue of used data identifiers is to serve as a reference in an updating step S200. Namely, in the event of a miss ("no" in step S110) the data identifier of the data unit that missed is written back to the n-th last data ide ntifier in the queue or stack of used identifiers, to thereby perform an association. This shall be explained in more detail with reference to two simple examples in FIGS. 9a and 9b.

Figure 9A:
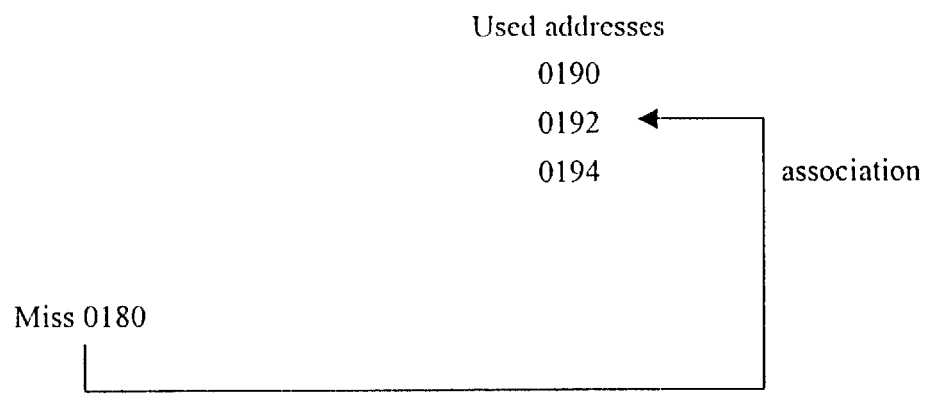
FIGS. 9a and 9b are schematic representations for explaining the preferred process of updating the preferred data identifiers.
Figure 9B:
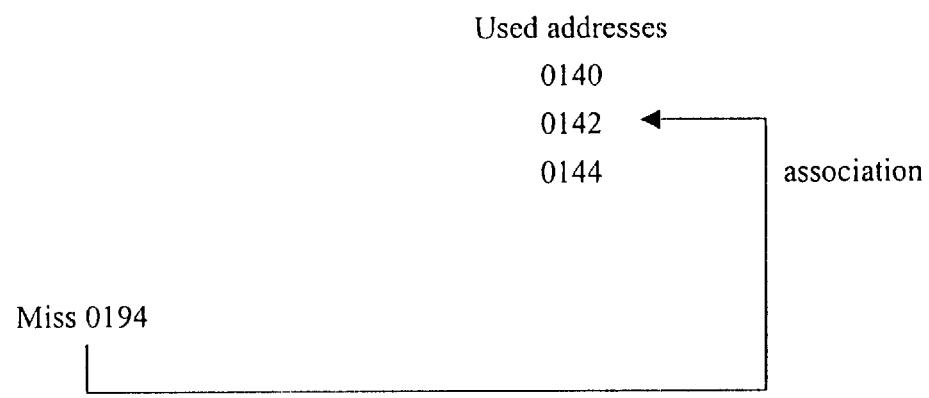

FIGS. 9a and 9b show queues for used addresses that correspond to the example of FIG. 3. The respective queues or stacks shown on the right-hand side show the last used address at the bottom, the next-to-last used address on top of that, and the address used before the next-to-last address on top of the latter. Therefore, FIG. 9a shows that first address 0190 was used, then address 0192, and then address 0194. As can be seen in FIG. 3, the instruction corresponding to address 0194 leads to a branching 302, and the example of FIG. 9a assumes that this branching causes a miss in buffer 50. Then, in accordance with step S200 this missed data identifier 0180 is associated with the data unit belonging to data identifier 0192. In other words, the missed data identifier is written back to the second to last used data unit as a prefetch data identifier. The association will be performed as discussed above in connection with FIG. 2, namely the prefetch data identifier 0180 can be written into the data unit belonging to identifier 0192, can be stored directly together with said data unit (but in a separate field) or can be written into a separate table, where the prefetch data identifier 0180 is referenced by the identifier 0192.

FIG. 9b shows a second example where the used addresses are 0140 to 0144. Similar to the example of FIG. 9a, it is assumed that the jump 301 to the instruction associated with address 0194 leads to a miss, such that the data identifier 0194 is associated with the data unit identified by 0142.

It may be noted that although the used addresses shown are consecutive addresses, these are only illustrative examples, and in general there will also be situations in which the used addresses shall contain jumps.

In the above examples, the association was performed with respect to the second last used address or data identifier. Naturally, the writing back will generally take place to the n-th last used data identifier, where n is an integer. Namely, it is equally well possible to perform an association with respect to the last used data identifier or the third last, fourth last, etc. The selection of how far to write back a missed data identifier will depend on the circumstances of the individual application. One important parameter to consider is the delay time between fetching a data unit from the cache 20 and that data unit actually being available. Namely, the writing-back should take this delay into account such that by the time the procedure advances to the data identifier that missed, the prefetch procedure for this data unit (initiated by the procedure in Step S170) has taken place such that the corresponding data unit is then available. It is understandable that the size of the queue of used addresses or used data identifiers will be chosen in accordance with how far back missed data identifiers are written.

It should be noted that the writing back does not have to have a fixed depth, i.e. it is not necessary to always write back to the n-th last used data unit. Much rather, it is also possible to implement a flexible write back that depends on further available information, such that e.g. some prefetch data identifiers will be written back to the n-th last used data unit, others to the (n−1)-th last used, etc. This will be explained in more detail with respect to the embodiment of FIG. 10. It should also be noted that naturally the update procedure described in connection with FIG. 8 can also be implemented in the more specific examples of FIGS. 5 to 7.

Figure 10:
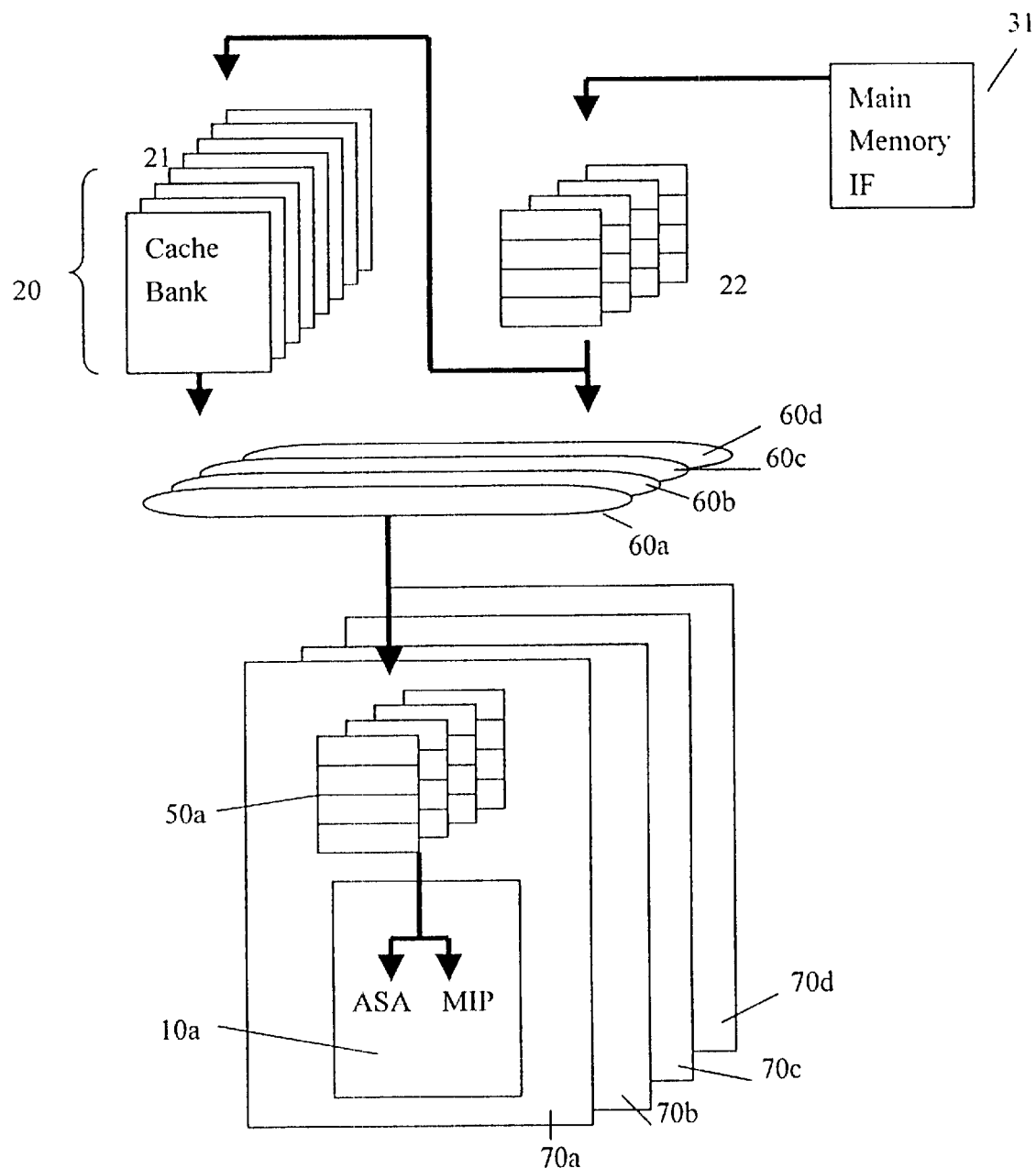
FIG. 10 is a preferred embodiment of the data processing system according to the present invention.

Now, a preferred embodiment of the present invention shall be described, which the inventor presently considers as the best mode. A schematic representation is shown in FIG. 10. The system of FIG. 10 is a three-level memory hierarchy, where the first level is the prefetch queue implemented in form of stream buffers 50a, where these stream buffers 50a are provided separate from a respective execution pipeline, into which the entries of the stream buffers 50a are given on request. As can be seen, each stream buffer 50 and execution pipeline 10 form a pair 70, where FIG. 10 shows four pairs 70a, 70b, 70c and 70d as examples. Naturally, a smaller or larger number of pairs can also be provided.

The execution pipeline 10a plays the role of the data requesting element. The stream buffer 50a plays the role of the second memory element. The stream buffer 50a is preferably a multi-way stream buffer, i.e. a predetermined number of stream buffers as shown in FIG. 2 are provided in parallel. The example of FIG. 10 indicates four such stream buffers connected in parallel.

The second level of the memory hierarchy is formed by a large on-chip cache 21 and memory stream buffers 22, where the elements 21 and 22 are accessed in parallel. These two elements 21 and 22 together constitute the first memory element 20 (see FIG. 1). The cache 21 and stream buffers 22 are shared by all of the pairs 70a to 70d by means of multiplexing elements 60a to 60d, which are provided in correspondence to the elements 70a to 70d. The multiplexing elements form a multiplexing unit interposed between the execution pipe stream buffers 50 and the first memory element 20. The multiplexing unit handles the traffic between the plurality of cache banks and the plurality of execution pipelines. The individual multiplexing element corresponding to a given pipeline handles the different kinds of fetches that a stream buffer 50 may issue, as shall be explained in more detail with respect to FIG. 11.

It may be noted that this arrangement of cache 21 and stream buffers 22 is similar to the structure described in the Jouppi reference. It is important to note the difference between the stream buffers 22 and the stream buffers 50a, namely that the provision of stream buffers 22 in conjunction with the cache 21 is known, whereas the provision of stream buffers 50 in conjunction with an execution pipeline 10 is a new feature of the invention.

As indicated in the figure, the on-chip cache is divided into a number of cache banks (eight in the example of the Figure) allowing up to four simultaneous accesses (one from each execution pipeline, as long as the accesses target different memory banks). Bank selection is e.g. done by using the low order cache line bits.

Figure 12:
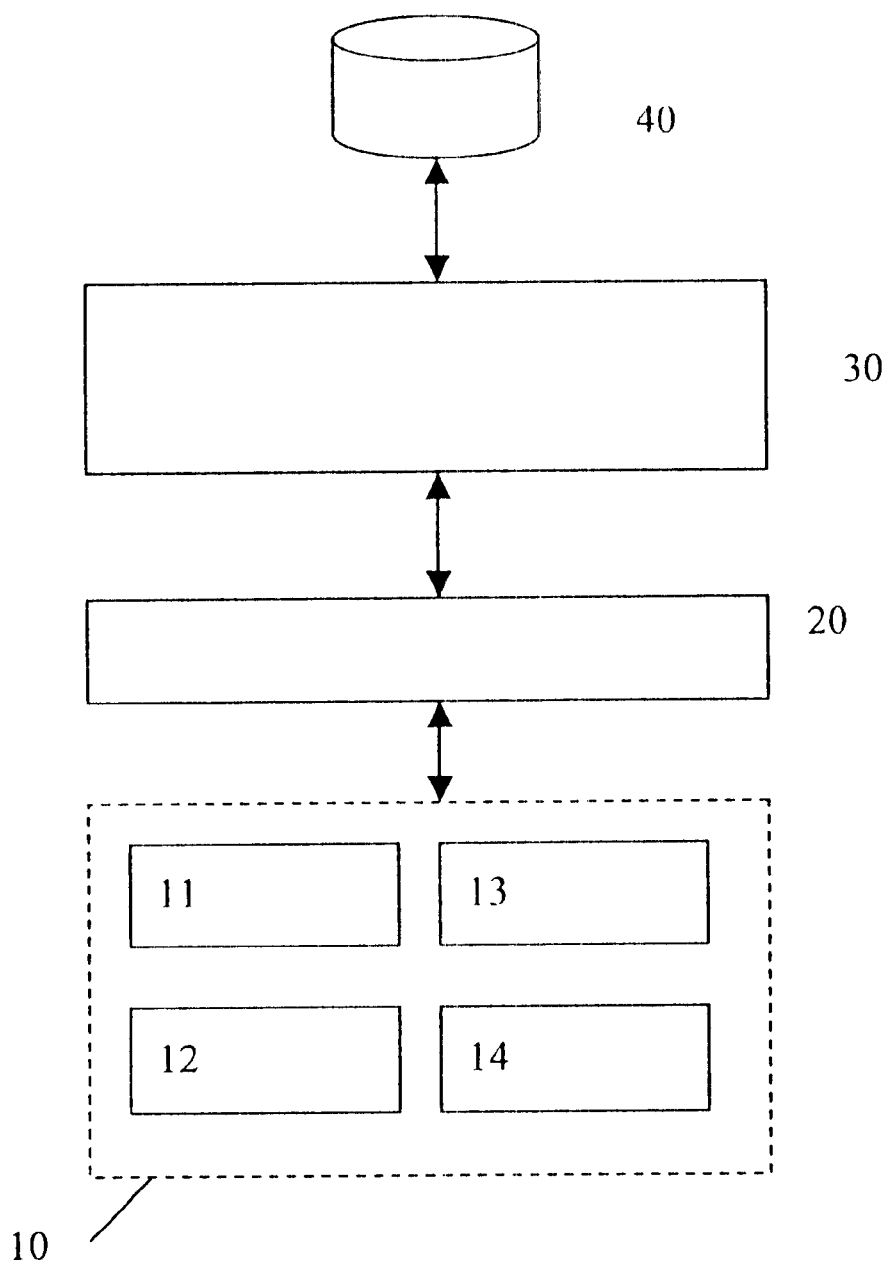
FIG. 12 is a schematic representation that shows a basic memory hierarchy.

Finally, a main store interface 31 is also represented in FIG. 10, which provides a connection between the level of elements 21 and 22 with lower levels of the memory hierarchy, e.g. with main memory 30 (as shown in FIG. 12).

Although the arrangement of FIG. 10 is a preferred example, it should naturally be noted that this example can also be varied in may ways. For example, the number of cache banks can basically be arbitrary, and equally the number of stream buffers provided in parallel as a multi-way stream buffer can also be arbitrary, both for the stream buffers 50a and the stream buffers 22. Also it is not necessary to provide a plurality of stream buffer/execution pipeline pairs 70. Furthermore, it is also not necessary to provide the stream buffer 22 in parallel to the cache 21, such that the first memory element could also be constituted by the cache alone.

The execution pipeline 10a can perform one access each clock cycle from its local stream buffers 50a. This access can be either a fetch of ASA-instructions (instructions in assembler code) or MIP-instructions (micro program instructions). The stream buffer 50a is virtually tagged, which means that an entry can be tagged either with the virtual address IA (instruction address) for entries holding ASA, or with CMA (code memory address) for entries holding MIP.

In the example of FIG. 10, the individual stream buffers that form the multi-way stream buffer 50a has four entries (as shown in FIG. 2). If an access from the execution pipeline 10a hits in one of the first two entries (lower two entries in FIG. 2), then the stream buffer simply delivers the requested data to the execution pipeline. If an access hits in one of the two last entries, then the stream buffers shifts two positions, moving the two tail entries to the head positions, and then it initiates a request of the next two sequential cache lines from the cache system to fill the empty positions. In other words, this is an example where the second predetermined change in status that leads to a sequential prefetch is a condition relating to the filling degree of the stream buffer. Namely, when the lower two entries become empty, a sequential prefetch is conducted.

If an access from the execution pipe misses in the stream buffer 50a, then one of the stream buffers of the multi-way stream buffer is selected using an LRU algorithm and is flushed. As already mentioned previously, a multi-way stream buffer is a parallel arrangement of a plurality of stream buffers as shown in FIG. 2. The (pseudo) LRU algorithm then selects one of these stream buffers. The algorithm can be chosen in any suitable or desirable ways. For example, the least recently used stream buffer can be defined as the stream buffer in which the least recently used entry is present. Naturally, more complicated algorithms are also possible such as algorithms that calculate a weighted parameter on the basis of all of the entries in an individual stream buffer of the multi-way stream buffer. After having determined a specific stream buffer and after having flushed this specific buffer, accesses for sequential cache lines are initiated to fill this buffer. The requested line is immediately forwarded to the execution pipeline in parallel with the loading into the stream buffer (see explanation corresponding to arrows 104 and 105 in FIG. 1).

The entries in the stream buffers of the multi way stream buffers 50a are tagged with a physical memory address. Each entry also has an availability bit that indicates whether the line has a pending cache access, and the entry has possible further fields, such as e.g. a private valid bit.

The instruction cache 21, which is shared by all of the pairs 70a–70d is accessed using the physical memory addresses. A cache access is initiated either by doing a sequential fill of stream buffers or when detecting a stream buffer miss. In the latter case, the physical address for the ASA access is calculated in parallel with searching the stream buffers, and an access can be initiated immediately when the miss is detected.

The memory stream buffers 22 are accessed in parallel with the instruction cache look-up. The basic function is the same as for the execution pipeline stream buffers 50a. When an access hits in one of the first two entries, then the corresponding memory data is forwarded without any action. When an access hits in the last two positions, the stream buffer is shifted two positions and a memory read is generated for fetching the two sequential cache lines from the main store interface 31.

As mentioned above, the execution pipeline stream buffer 50a are multi-way stream buffers, where each of the individual stream buffers of one multi-way stream buffer is a quasi-sequential stream buffer. As a consequence, each individual stream buffer of the multi-way stream buffer has its own prefetch queue, i.e. there is a plurality of parallel prefetch queues in a multi-way stream buffer. An advantage of such a plurality of parallel queues is that prefetching occurs among multiple paths, where one of the stream buffers in a multi-way stream buffer can store incoming data units from a certain path (e.g. an address that is defined by a prefetch address associated with a given data unit being fetched from the stream buffer, and the subsequent sequential addresses) without having to flush other prefetched instructions in the current path. An example of this can be given by using the example shown in FIG. 9b. Namely, in FIG. 9b address 0142 was associated with address 0194. If one now assumes that the execution has progressed to a point where address 0142 is again called by the execution pipeline, then the entry identified by this address will be read out and it will be detected that a prefetch data identifier, namely 0194, is associated with 0142, whereupon a prefetch on the basis of this prefetch data identifier can be conducted. As explained in connection with the previous embodiments, a sequential prefetch can also be performed. Then, when using multi-way stream buffers, it is possible to queue one path in one queue and another path in another queue. Namely, a prefetch path based on the prefetch data identifier 0194 could e.g. consist of 0194, 0180, 0182 (see jump 302 in FIG. 3), while a sequential prefetch could consist in 0144, 0146 and 0148. These two different prefetch paths are then stored in respective queues, i.e. in respective stream buffers of the multi-way stream buffer.

As already described in connection with FIG. 2, the individual stream buffers of the multi-way stream buffer are quasi-sequential, which means that a comparison with the tag (501 in FIG. 2) can be conducted for any of the entries, and not only for the head entry. The allocation of an entry in the stream buffer is made immediately when the demand is sent to lower levels of the memory hierarchy, even if it can take many cycles until data arrives. The fact that a demand has been sent but that the corresponding data unit has not yet arrived is expressed by the availability indicator (for example 1 bit). Any requests from the execution pipe for a data unit (memory words or cache lines) that are in the progress of being fetched, but not yet available, will be detected as a stream buffer hit but will not generate the new access.

As already indicated above, the first predetermined change in status is defined as a data unit readout in the example of FIG. 10. The predetermined condition relating to a prefetch data identifier simply consists in checking if a prefetch data identifier is associated with the data unit that was read out. If this is the case, then a prefetch is performed on the basis of the prefetch data identifier.

The updating of the prefetch data identifier associated with certain data units is performed as explained above in connection with FIG. 9. Namely, the prefetch data identifiers are updated when detecting a miss in the process of fetching data units (e.g. memory words, or equally well data lines) by the execution pipeline. The address that missed is used as a new prefetch data identifier, which is written back to a cache position that was fetched by the execution pipeline n fetches earlier, where n is in integer. Only one prefetch data identifier will be generated for the same data unit, because the stream buffer also detects hits on data units that are requested but not yet available.

The next time the same data unit is requested by the execution pipe, the associated prefetch data identifier will be provided in parallel (e.g. by already being a part of the data unit, or by a look-up operation in an appropriate field of the entry in the stream buffer, or by a look-up in a table).

It may be noted that the LRU information for entry allocation should be updated both for fetches and for fills, i.e. both for read outs and for load events, because otherwise the same entry could be used over and over again for sequential prefetches that may be generated before the first one is used.

In the example of FIG. 10, the cache is two-way set associative, and the update of the prefetch data identifier must be directed to the correct block in the cache. This is done by keeping information about the source of a cache read-out. This information follows the cache line in the entry in the stream buffer (and can e.g. be placed in the additional field 506 shown in FIG. 2) to the "used address queue" (see FIG. 9) and is used as a part of the cache address during an update of the prefetch data identifier.

The updating of the prefetch data identifiers is preferably done without any checks whether the cache line indicated by the cache address has been replaced or not.

If more than one execution pipeline performs prefetch data identifier updates to one cache bank in one clock cycle, then preferably only one of the updates will be done and the others will be discarded. However, it is also possible to queue the updates and only discard updates if the queue is full.

As described above, prefetch data identifiers are written back a fixed number of steps or accesses, in order to take into account the access time. When using a normal cache hierarchy, then the access time will, however, vary depending on whether the access hits in a lower level memory or not. Therefore, varying access time can be a problem. If prefetch data identifiers are inserted to cover the access delay time for the next memory level (i.e. is only written back a short distance) then the execution might stall when there is a miss in this next level memory. On the other hand, if the prefetch data identifiers are written back to take into account the longest access delay time (written back very far), namely the delay due to accessing the main memory, then data units prefetched into the stream buffer due to prefetched data identifiers may be far ahead of the actual execution procedure, and it is possible that earlier paths may be squeezed out from the stream buffers (if there are not enough entries in each individual stream buffer or not enough parallel stream buffers in the multi-way stream buffer). Therefore, one solution is to write back the prefetch data identifiers as far as necessary for an access to the main memory and to provide sufficiently large stream buffers (i.e. having a sufficiently large number of entries) and providing a sufficient number of parallel stream buffers in each multi-way stream buffer. On the other hand, if it is not feasible to increase the stream buffer size beyond a certain point, then a good solution consists in writing the prefetch data identifiers back to a point in between the short write-back defined by the access time of the next level memory and the long write-back defined by the access to the slower memory level.

It should be noted that the depth of writing back does not have to be fixed, e.g. it is not necessary to always write back to the second last used data unit. Much rather, the process of writing back a prefetch data identifier can be adapted dynamically. For example, if the cache 21 is designed as a static cache as described in co-pending patent application SE-0000533-0, which is herewith incorporated by reference, then these caches are controlled by an operating system and the allocation of instructions and data is semi-static. It is then possible to determine in which level of the memory hierarchy an address will hit when the prefetch data identifier is generated during the update process, and thereby it is possible to select an address at the right depth in the used address queue. In its simplest form a static cache for instructions stores the instructions for an entire code block (similar to a class in an object oriented language). Selecting the depth in the used address queue can then be made on block level. Static caches are mapped into the memory space and instructions and data are allocated to the cache by relocating them in the physical address space. This means that the access time for all individual memory accesses can also be determined by the memory address. Another way of selecting the proper depth in the used address queue is by decoding the memory address.

Figure 11:
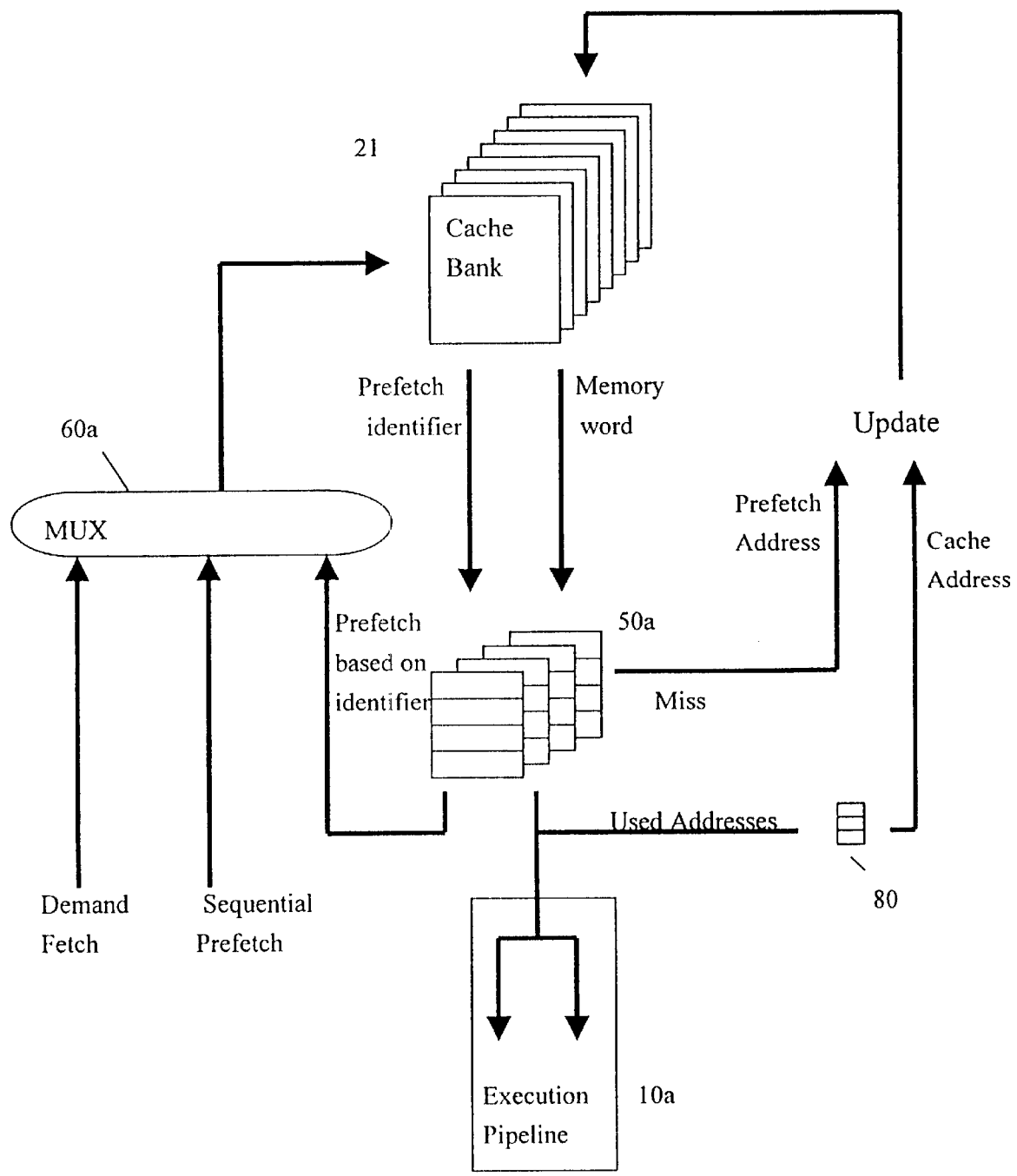
FIG. 11 is a schematic representation for describing the operation of the system of FIG. 10.

FIG. 11 contains a schematic overview of the above described operation of the system in FIG. 10. For simplicity only one execution pipeline stream buffer 50a and only one execution pipeline 10a is shown. As indicated by the used address queue 80, each read out of a word (in this example the data units read out from the cache banks are memory words) leads to the cache address of the used words being stored in a queue 80. Then, when a miss occurs, the missed address is associated with one of the used addresses in queue 80 to thereby update the prefetch addresses in the cache bank. Namely, in the example of FIG. 11, the prefetch address is simply written into the cache line at an appropriate position provided for this purpose. Then, if the corresponding memory word is later fetched into the stream buffer 50a, the prefetch address is automatically also loaded together with the memory word.

As indicated on the left-hand side of FIG. 11 the multiplexing element 60a deals with a number of different demands. Namely, there are demand fetches relating to a miss in the stream buffer 50a, there are sequential prefetch demands and there are prefetch demands associated with prefetch addresses. Preferably, the multiplexing element 60 is operated in such a way that there is a priority among these different demands, namely that demands due to a miss have the highest priority (because a miss causes a direct delay in program execution and must be dealt with as fast as possible), then sequential prefetch demands have the second highest priority and prefetch demands due to a prefetch address in a data unit have the lowest priority.

Regarding specific implementation considerations for hardware, which will only be mentioned briefly as they are of no specific importance for the present invention, it may be said that a standard way of designing microprocessors is to include a single cycle first level cache. To cycle this cache with the high frequency of a modern microprocessor requires extensive speed tuning for the cache and memory design, including the use of high speed memory macros, dynamic logic, matched traces, etc. When using an ASIC design methodology, memory macros are instead synthesized and usually tuned for high density rather than high speed. The design proposed above in the various embodiments targets that environment by using stream buffers as a small first level structure that should be possible to cycle at a high speed without requiring custom memory design. It is feasible to use flip-flops instead of memory.

Prefetch data identifiers (e.g. prefetch addresses) move the RAM requirements to high density rather than speed. An extra clock cycle delay can be compensated by issuing the prefetch earlier. Higher density will be needed due to the supplementary storage space needed for the prefetch data identifiers.

The concept of the present invention is preferably applied to processing systems in telecommunication systems, because the code implemented in such systems typically displays frequent and short jumps forward, such that the concept of sequential prefetching and prefetching on the basis of identifiers is especially effective.

The above described embodiments serve to better understand the concept of the invention, but are not intended to be understood as restricting the invention. Much rather, the present invention is defined by the appended claims. Also, reference numerals in the claims serve to make the claims easier to read, but do not restrict the scope.

What is claimed is:

1. A data processing system, comprising
   a first memory element for storing data, from which data is read out in predetermined data units, each data unit being identified by a data identifier,
   a second memory element for receiving data units from said first memory element, said second memory element being arranged to store a plurality of data units read from said first memory element, a data requesting element that requests data from said second memory element, where said data requesting element comprises an element for establishing a sequence of data identifiers, each data identifier relating to data to be requested, and where the requesting procedure of said data requesting element is controlled in accordance with a program that proceeds according to said sequence, said data requesting element being operable to perform a request for data by providing said second memory element with a data identifier related to data being requested, where said second memory element is operable to provide said data requesting element with data being requested if the data being requested is present in said second memory element, and is furthermore operable to perform a prefetch procedure for data units from said first memory element, said prefetch procedure comprising:

upon detecting a first predetermined change in status of said second memory element, determining a first given data unit in said second memory element associated with said first predetermined change in status, checking if said first given data unit fulfils a predetermined condition, said predetermined condition relating to a prefetch data identifier stored in association with said first given data unit, said prefetch data identifier identifying a different data unit than said first given data unit, and if said predetermined condition is fulfilled, giving to said first memory element a demand for at least a data unit identified by said prefetch data identifier stored in association with said first given data unit, and upon detecting a second predetermined change in status of said second memory element, determining a second given data unit in said second memory element associated with said second predetermined change in status, and giving said first memory element a demand for at least a data unit identified by the data identifier that in said sequence follows the data identifier relating to the second given data unit.

2. The data processing system of claim 1, further comprising a third memory element for storing data identifiers, said data identifiers identifying the data most recently requested by said data requesting element and being stored in the order of their last having been requested, said data processing system being operable to perform a procedure such that if data identified by a data identifier provided by said data requesting element to said second memory element as a data request is not present in said second memory element, the data identifier for which no related data is present in said second memory element is associated with a data identifier belonging to a previous request stored in said third memory element, and then said data identifier for which no related data is present in said second memory element is stored as a prefetch data identifier in association with the data unit in said first memory element identified by said previous data identifier.

3. The data processing system of claim 2, wherein said data identifier belonging to a previous request, with which said data identifier for which no related data is present in said second memory element is associated, is determined as lying at a predetermined depth position in the order of stored data identifiers with respect to the data identifier most recently stored in said third memory element.

4. The data processing system of claim 3, wherein said depth position is variable.

5. The data processing system of claim 1, wherein a prefetch data identifier stored in association with a given data unit is stored together with said given data unit in the first memory element.

6. The data processing system of claim 5, wherein a prefetch data identifier stored in association with a given data unit is stored as a part of said given data unit.

7. The data processing system of claim 1, wherein a prefetch data identifier stored in association with a given data unit is stored separately from said given data unit in a designated table.

8. The data processing system of claim 7, wherein said designated table stores the data identifier identifying a given data unit together with the prefetch data identifier associated with the given data unit.

9. The data processing system of claim 1, wherein said first memory element comprises a cache memory.

10. The data processing system of claim 9, wherein said cache memory is an instruction cache.

11. The data processing system of claim 9, wherein said data units are one of data words and cache lines.

12. The data processing system of claim 1, wherein said second memory element comprises a stream buffer.

13. The data processing system of claim 12, wherein said second memory element comprises a multi-way stream buffer.

14. The data processing system of claim 1, wherein said data requesting element comprises a processor, and said element for establishing a sequence of data identifiers comprises a program counter.

15. The data processing system of claim 1, wherein said first predetermined change in status of said second memory element is the reading out of a data unit to said data requesting element, and said second memory element associated with said first predetermined change in status is the data unit read out.

16. The data processing system of claim 1, wherein said first predetermined change in status of said second memory element is the loading of a data unit into said second memory element, and said second memory element associated with said first predetermined change in status is the loaded data unit.

17. The data processing system of claim 1, wherein said checking of said predetermined condition relating to a prefetch data identifier comprises checking for the presence of said prefetch data identifier.

18. The data processing system of claim 1, wherein each data unit comprises a prefetch data identifier valid indicator, and said checking of said predetermined condition relating to a prefetch data identifier comprises checking the setting of said prefetch data identifier valid indicator.

19. The data processing system of claim 1, wherein detecting said second predetermined change in status of said second memory element comprises detecting said first predetermined change in status of said second memory element, and said second given data unit associated with said second predetermined change in status is identical with said first given data unit associated with said first predetermined change in status.

20. The data processing system of claim 19, wherein detecting said second predetermined change in status of said second memory element is identical with detecting said first predetermined change in status of said second memory element.

21. The data processing system of claim 19, wherein detecting said second predetermined change in status of said second memory element additionally comprises detecting that said first given data unit does not fulfil said predetermined condition.

22. The data processing system of claim 1, wherein said second predetermined change in status of said second memory element is associated with the degree of filling of said second memory element falling below a predetermined limit.

23. The data processing system of claim 1, wherein said first memory element comprises an instruction cache memory, said second memory element comprises a multi-way stream buffer, said data requesting element comprises an execution pipeline belonging to a processor, the element for establishing a sequence of data identifiers being the program instruction counter, a multiplexing element is provided between the multi-way stream buffer and the first memory element, said multiplexing element being operable to handle data demands from said plurality of multi-way stream buffers to said cache memory in such a way that data demands due to data requested by an execution pipeline not being present in said multi-way stream buffers have higher priority than data demands due to a prefetch operation on the basis of the data identifier that in the sequence follows the data identifier relating to the second given data unit, and data demands due to a prefetch operation on the basis of the data identifier that in the sequence follows the data identifier relating to the second given data unit have a higher priority than data demands due to a prefetch operation on the basis of a prefetch data identifier.

24. The data processing system of claim 1, wherein said second memory element comprises a plurality of multi-way stream buffers, said data requesting element comprises a plurality of execution pipelines, each respective execution pipeline being connected to a respective multi-way stream buffer of said second memory element, and where furthermore a plurality of multiplexing elements is provided between the plurality of multi-way stream buffers and the first memory element, such that all multi-way stream buffers of said plurality can access said instruction cache memory.

25. A method of controlling a data processing system, said data processing system comprising a first memory element for storing data, from which data is read out in predetermined data units, each data unit being identified by a data identifier, a second memory element for receiving data units from said first memory element, said second memory element being arranged to store a plurality of data units read from said first memory element, a data requesting element that requests data from said second memory element, where said data requesting element comprises an element for establishing a sequence of data identifiers, each data identifier relating to data to be requested, and where the requesting procedure of said data requesting element is controlled in accordance with a program that proceeds according to said sequence, said data requesting element being operable to perform a request for data by providing said second memory element with a data identifier related to data being requested, where said method comprises that second memory element is operated to provide said data requesting element with data being requested if the data being requested is present in said second memory element, and said method furthermore comprises that second memory element is operated to perform a prefetch procedure for data units from said first memory element, said prefetch procedure comprising:

upon detecting a first predetermined change in status of said second memory element, determining a first given data unit in said second memory element associated with said first predetermined change in status, checking if said first given data unit fulfils a predetermined condition, said predetermined condition relating to a prefetch data identifier stored in association with said first given data unit, said prefetch data identifier identifying a different data unit than said first given data unit, and if said predetermined condition is fulfilled, giving to said first memory element a demand for at least a data unit identified by said prefetch data identifier stored in association with said first given data unit, and upon detecting a second predetermined change in status of said second memory element, determining a second given data unit in said second memory element associated with said second predetermined change in status, and giving said first memory element a demand for at least a data unit identified by the data identifier that in said sequence follows the data identifier relating to the second given data unit.

26. The method of claim 25, wherein a third memory element is provided for storing data identifiers, said data identifiers identifying the data most recently requested by said data requesting element and being stored in the order of their last having been requested, said method furthermore comprising performing a procedure such that if data identified by a data identifier provided by said data requesting element to said second memory element as a data request is not present in said second memory element, the data identifier for which no related data is present in said second memory element is associated with a data identifier belonging to a previous request stored in said third memory element, and then said data identifier for which no related data is present in said second memory element is stored as a prefetch data identifier in association with the data unit in said first memory element identified by said previous data identifier.

27. The method of claim 26, wherein said data identifier belonging to a previous request, with which said data identifier for which no related data is present in said second memory element is associated, is determined as lying at a predetermined depth position in the order of stored data identifiers with respect to the data identifier most recently stored in said third memory element.

28. The method of claim 27, wherein said depth position is variable.

29. The method of claim 25, wherein a prefetch data identifier stored in association with a given data unit is stored together with said given data unit in the first memory element.

30. The method of claim 29, wherein a prefetch data identifier stored in association with a given data unit is stored as a part of said given data unit.

31. The method of claim 25, wherein a prefetch data identifier stored in association with a given data unit is stored separately from said given data unit in a designated table.

32. The method of claim 31, wherein said designated table stores the data identifier identifying a given data unit together with the prefetch data identifier associated with the given data unit.

33. The method of claim 25, wherein said first predetermined change in status of said second memory element is the reading out of a data unit to said data requesting element, and said second memory element associated with said first predetermined change in status is the data unit read out.

34. The method of claim 25, wherein said first predetermined change in status of said second memory element is the loading of a data unit into said second memory element, and said second memory element associated with said first predetermined change in status is the loaded data unit.

35. The method of claim 25, wherein said checking of said predetermined condition relating to a prefetch data identifier comprises checking for the presence of said prefetch data identifier.

36. The method of claim 25, wherein each data unit comprises a prefetch data identifier valid indicator, and said checking of said predetermined condition relating to a prefetch data identifier comprises checking the setting of said prefetch data identifier valid indicator.

37. The method of claim 25, wherein detecting said second predetermined change in status of said second memory element comprises detecting said first predetermined change in status of said second memory element, and said second given data unit associated with said second predetermined change in status is identical with said first given data unit associated with said first predetermined change in status.

38. The method of claim 37, wherein detecting said second predetermined change in status of said second memory element is identical with detecting said first predetermined change in status of said second memory element.

39. The method of claim 37, wherein detecting said second predetermined change in status of said second memory element additionally comprises detecting that said first given data unit does not fulfil said predetermined condition.

40. The method of claim 25, wherein said second predetermined change in status of said second memory element is associated with the degree of filling of said second memory element falling below a predetermined limit.

41. The method of claim 25, wherein said first memory element comprises an instruction cache memory, said second memory element comprises a multi-way stream buffer, said data requesting element comprises an execution pipeline belonging to a processor, the element for establishing a sequence of data identifiers being the program instruction counter, a multiplexing element is provided between the multi-way stream buffer and the first memory element, wherein said method comprises that said multiplexing element is operated to handle data demands from said plurality of multi-way stream buffers to said cache memory in such a way that data demands due to data requested by an execution pipeline not being present in said multi-way stream buffers have higher priority than data demands due to a prefetch operation on the basis of the data identifier that in the sequence follows the data identifier relating to the second given data unit, and data demands due to a prefetch operation on the basis of the data identifier that in the sequence follows the data identifier relating to the second given data unit have a higher priority than data demands due to a prefetch operation on the basis of a prefetch data identifier.

\* \* \* \* \*